(12) United States Patent
Granot et al.

(10) Patent No.: US 9,325,425 B2
(45) Date of Patent: Apr. 26, 2016

(54) METHOD AND APPARATUS FOR DEMODULATING AND REGENERATING PHASE MODULATED OPTICAL SIGNALS

(75) Inventors: Er'el Granot, Herzliya (IL); Shalva Ben-Ezra, Rehovot (IL); Yinnon Stav, Ra'anana (IL); Sagie Tsadka, D.N. Emek Sorek (IL); Heider Ereifej, Chalfont, PA (US)

(73) Assignee: Finisar Corporation, Horsham, PA (US)

( * ) Notice: Subject to any disclaimer, the term of this patent is extended or adjusted under 35 U.S.C. 154(b) by 222 days.

(21) Appl. No.: 12/391,233

(22) Filed: Feb. 23, 2009

(65) Prior Publication Data

US 2009/0279902 A1    Nov. 12, 2009

Related U.S. Application Data

(60) Provisional application No. 61/031,004, filed on Feb. 24, 2008.

(51) Int. Cl.
*H04B 10/00* (2013.01)
*H04B 10/67* (2013.01)

(52) U.S. Cl.
CPC .................................. *H04B 10/677* (2013.01)

(58) Field of Classification Search
USPC ................................................. 398/202–214
See application file for complete search history.

(56) References Cited

U.S. PATENT DOCUMENTS

| | | | |
|---|---|---|---|
| 5,181,136 A | 1/1993 | Kavehrad et al. | |
| 5,524,076 A | 6/1996 | Rolland et al. | |
| 6,798,557 B1 | 9/2004 | Leven | |
| 6,947,206 B2 | 9/2005 | Tsadka et al. | |
| 7,389,055 B1 * | 6/2008 | Rickard | H04B 10/505 398/206 |
| 7,411,725 B2 * | 8/2008 | Suzuki | G02B 6/29349 359/325 |

(Continued)

FOREIGN PATENT DOCUMENTS

| | | |
|---|---|---|
| EP | 0 967 743 A2 | 12/1999 |
| EP | 1 519 499 A1 | 3/2005 |

(Continued)

OTHER PUBLICATIONS

"Notification of Transmittal of the International Search Report and the Written Opinion of the International Searching Authority, or the Declaration" for PCT/US2009/034919, Sep. 28, 2009, 11 pages, the International Searching Authority/KR, Seo-gu, Daejeon, Republic of Korea.

(Continued)

*Primary Examiner* — Agustin Bello
(74) *Attorney, Agent, or Firm* — Kurt Rauschenbach; Rauschenbach Patent Law Group, LLC

(57) ABSTRACT

A DPSK/DQPSK receiver includes an optical splitter that separates the received DPSK/DQPSK optical signal according to an optical power splitting ratio into a plurality of received optical signals. A plurality of optical filters passes a plurality of filtered received optical signals. A plurality of optical detectors generates a plurality of electrical detection signals, each with a power that is related to a power of a respective filtered optical signal. A plurality of amplifiers generates a plurality of amplified electrical signals. At least one electrical signal combiner combines the plurality of amplified electrical detection signals generated by the plurality of optical amplifiers into a combined reception signal.

27 Claims, 18 Drawing Sheets

(56) References Cited

U.S. PATENT DOCUMENTS

| | | | | |
|---|---|---|---|---|
| 7,444,085 B2* | 10/2008 | Ikeuchi | H04B 10/66 | 398/154 |
| 7,613,403 B2* | 11/2009 | Hironishi | H04B 10/66 | 398/188 |
| 7,627,252 B2* | 12/2009 | Sun | H04L 7/027 | 398/147 |
| 7,636,525 B1* | 12/2009 | Bontu | H04B 10/60 | 398/208 |
| 7,684,713 B2* | 3/2010 | Terayama | H04B 10/66 | 398/155 |
| 7,734,196 B2* | 6/2010 | Takahara | H04B 10/66 | 398/202 |
| 7,751,721 B2* | 7/2010 | Hoshida | H04B 10/66 | 398/161 |
| 7,826,752 B1* | 11/2010 | Zanoni | H04B 10/5055 | 398/186 |
| 7,983,566 B2* | 7/2011 | Zhou | H04B 10/677 | 398/149 |
| 8,005,372 B2* | 8/2011 | Takahara | H04B 10/69 | 398/203 |
| 2002/0181547 A1* | 12/2002 | Feher | H04L 27/38 | 375/130 |
| 2003/0175036 A1 | 9/2003 | Mamyshev et al. | | |
| 2003/0175037 A1 | 9/2003 | Kimmitt et al. | | |
| 2003/0218790 A1 | 11/2003 | Mikkelsen et al. | | |
| 2004/0042802 A1* | 3/2004 | Ho | H04B 10/2543 | 398/208 |
| 2005/0012985 A1 | 1/2005 | Tsadka et al. | | |
| 2005/0088659 A1 | 4/2005 | Schlenk et al. | | |
| 2006/0072924 A1 | 4/2006 | Lee et al. | | |
| 2006/0193640 A1* | 8/2006 | Katagiri | H04B 10/66 | 398/188 |
| 2006/0280510 A1* | 12/2006 | Onaka | H04B 10/60 | 398/188 |
| 2007/0047954 A1* | 3/2007 | Mamyshev | G02F 1/0123 | 398/33 |
| 2007/0047972 A1* | 3/2007 | Ikeuchi | H04B 10/66 | 398/207 |
| 2007/0065157 A1* | 3/2007 | Katagiri | H04L 27/223 | 398/155 |
| 2007/0071457 A1* | 3/2007 | Takahara | H04B 10/66 | 398/207 |
| 2007/0177151 A1* | 8/2007 | Isomura | G02F 1/225 | 356/477 |
| 2007/0196110 A1* | 8/2007 | Mikkelsen | H04B 10/505 | 398/140 |
| 2007/0297043 A1* | 12/2007 | Kao | H04B 10/07953 | 359/337 |
| 2008/0056733 A1* | 3/2008 | Isomura | H04B 10/677 | 398/209 |
| 2008/0069565 A1* | 3/2008 | Takahara | H04B 10/69 | 398/79 |
| 2009/0074428 A1* | 3/2009 | Liu | H04B 10/2513 | 398/208 |
| 2009/0116851 A1* | 5/2009 | Heffner | H04B 10/677 | 398/208 |
| 2009/0202258 A1* | 8/2009 | Zhou | H04B 10/677 | 398/202 |
| 2009/0279902 A1* | 11/2009 | Granot | H04B 10/677 | 398/208 |
| 2009/0324247 A1* | 12/2009 | Kikuchi | G02F 1/225 | 398/159 |
| 2010/0111540 A1* | 5/2010 | Caplan | H04B 10/677 | 398/140 |
| 2011/0129230 A1* | 6/2011 | Zanoni | H04B 10/5055 | 398/140 |
| 2011/0280587 A1* | 11/2011 | Xie | H04B 10/671 | 398/202 |
| 2013/0163986 A1* | 6/2013 | Mamyshev | H04B 10/69 | 398/25 |

FOREIGN PATENT DOCUMENTS

| | | |
|---|---|---|
| GB | 2 257 319 A | 1/1993 |
| JP | 2007-158852 A | 6/2007 |
| WO | 2007025037 A2 | 3/2007 |

OTHER PUBLICATIONS

"Notification Concerning Transmittal of International Preliminary Report on Patentability (Chapter I of the Patent Cooperation Treaty)" for PCT/US2009/034919, Sep. 2, 2010, 6 pages, the International Bureau of WIPO, Geneva, Switzerland.

Agarwal, A., et al., Experimental Study of Photocurrent Imbalance in a 42.7-Gb/s DPSK Receiver Under Strong Optical Filtering, 2005, pp. 1-3, Optical Society of America.

Bosco, G., et al., The Impact of Receiver Imperfections on the Performance of Optical Direct-Detection DPSK Journal of Lightwave Technology, Feb. 2005, pp. 842-848, vol. 23, No. 2.

Gnauck, A.H., et al., 2.5 Tb/s (64×42.7 Gb/s) Transmission Over 40×100 km NZKSF Using RZ-DPSK Format and All-Raman-Amplified Spans, 2002, pp. FC2-1-FC2-3, Optical Society of America.

Humblet, et al., On the Bit Error Rate of Lightwave Systems With Optical Amplifies, Journal of Lightwave Technology, Nov. 1991, pp. 1576-1582, vol. 9, No. 11.

Lyubomirsky, et al., DPSK Demodulator Based on Optical Discriminator Filter, IEEE Photonics Technology Letters, Feb. 2005, pp. 492-494, vol. 17, No. 2.

Gnauck, et al., Optical Phase-Shift-Keyed Transmission, IEEE Journal of Lightwave Technology, vol. 23, pp. 115-130, 2005.

Lyubomirsky, et al., Impact of Optical Filtering on Duobinary Transmission, IEEE Photon, Technol. Lett 16, 1969 (2004).

Malouin, Differential Phase-Shift Keying Receiver Design Applied to Strong Optical Filtering, IEEE, Journal of Lightwave Technology, vol. 25, pp. 3536-3542, 2007.

Malouin, et al., DPSK Receiver Design-Optical Filtering Considerations, OFC 2007 OTHK 1.

Mikkelsen, et al., Partial DPSK With Excellent Filter Tolerance and OSNR Sensitivity, Electronics Letters, vol. 42, pp. 1363-1365, 2006.

Winzer, et al., Degradations in Balanced DPSK Receivers, IEEE Photonics Technology Letters, vol. 15, No. 9, Sep. 2003.

European Patent Office, "Extended European Search Report" for European Patent Application No. 09713429.0 dated Mar. 28, 2014, 23 pages.

Wang, Jin et al., "Impact of Chromatic and Polarization-Mode Dispersion on DPSK Systems Using Interferometric Demodulation and Direct Detection" Journal of Lightwave Technology, vol. 22, No. 2, Feb. 2004, pp. 362-371.

Zheng, Xueyan et al., "Receiver Optimization for 40-Gb/s Optical Duobinary Signal" IEEE Photonics Technology Letters, vol. 13, No. 7, Jul. 2001, pp. 744-746.

* cited by examiner

METHOD AND APPARATUS FOR DEMODULATING AND REGENERATING PHASE MODULATED OPTICAL SIGNALS

CROSS-REFERENCE TO RELATED APPLICATIONS

The present application claims priority to U.S. Provisional Patent Application Ser. No. 61/031,004, filed on Feb. 24, 2008. The entire contents U.S. Provisional Patent Application Ser. No. 61/031,004 is herein incorporated by reference.

The section headings used herein are for organizational purposes only and should not to be construed as limiting the subject matter described in the present application.

BACKGROUND OF THE INVENTION

The need for high bit-rate data transmissions through optical fibers presents significant challenges to the fiber-optic telecommunications industry. High bit-rate systems are highly susceptible to optical fiber nonlinearities. One option to confront these changes is to transmit the data in the Differential-Phase Shift Keying (DPSK) modulation format. The DPSK modulation format can transmit both RZ and NRZ data formats. One benefit of using the DPSK modulation format over the more standard On-Of Keying (OOK) modulation format is that, when DPSK signals are detected using a balanced receiver, the OSNR sensitivity is improved by up to 3 dB. See, for example, A. H. Gnauck and P. J. Winzer, "Optical Phase-Shift-Keyed Transmission," IEEE Journal of Lightwave Technology, vol. 23, pp. 115-30, 2005.

The DPSK modulation format has numerous advantages over the OOK modulation format. However, the DPSK modulation format is more complicated than the OOK format. In DPSK systems, the digital information is written in the optical phase of the signal and, therefore, the digital information cannot be detected by ordinary intensity detectors. Consequently, DPSK receivers typically include optical demodulators, which convert the phase modulated signal to an amplitude modulated signal. The resulting amplitude modulated signal can easily be detected by ordinary power detectors.

BRIEF DESCRIPTION OF THE DRAWINGS

The present teachings, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale, emphasis instead generally being placed upon illustrating principles of the invention. The drawings are not intended to limit the scope of the applicant's teachings in any way.

DETAILED DESCRIPTION

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

It should be understood that the individual steps of the methods of the present teachings may be performed in any order and/or simultaneously as long as the invention remains operable. Furthermore, it should be understood that the apparatus and methods of the present teachings can include any number or all of the described embodiments as long as the invention remains operable.

The present teachings will now be described in more detail with reference to exemplary embodiments thereof as shown in the accompanying drawings. While the present teachings are described in conjunction with various embodiments and examples, it is not intended that the present teachings be limited to such embodiments. On the contrary, the present teachings encompass various alternatives, modifications and equivalents, as will be appreciated by those of skill in the art. Those of ordinary skill in the art having access to the teachings herein will recognize additional implementations, modifications, and embodiments, as well as other fields of use, which are within the scope of the present disclosure as described herein.

Figure 1:
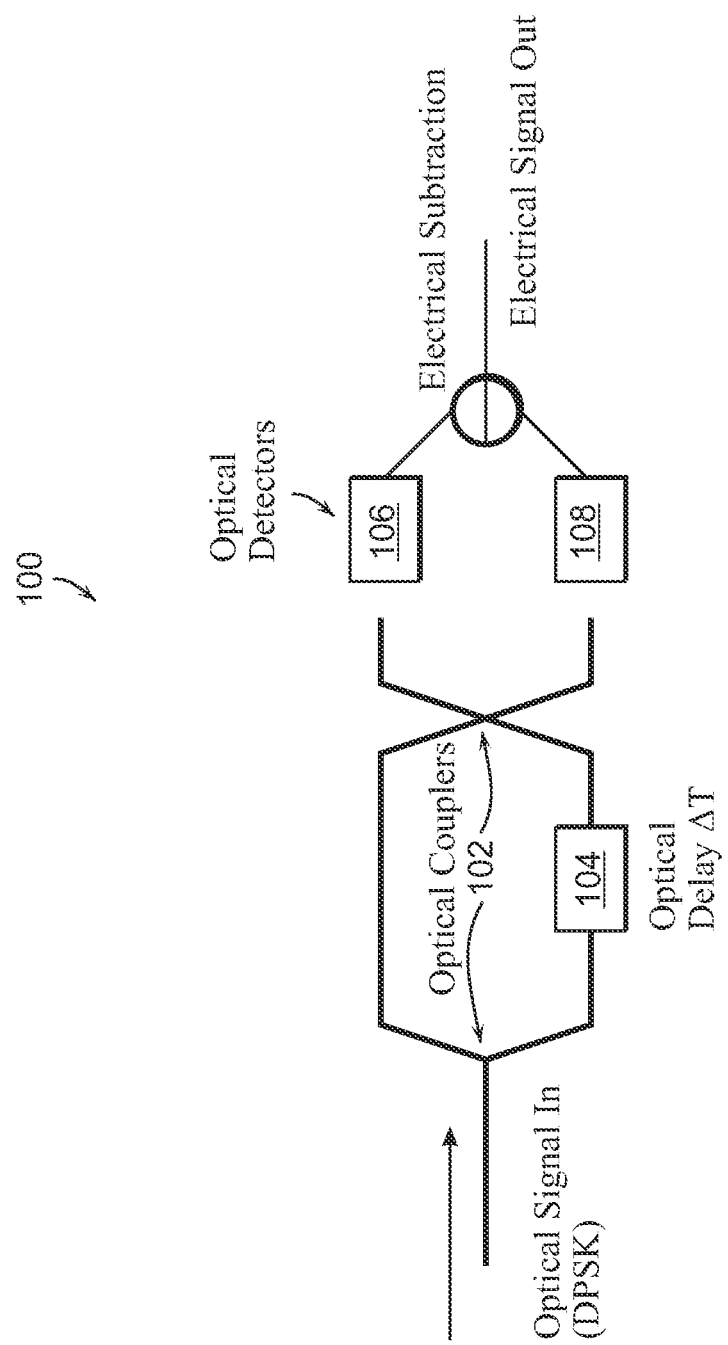
FIG. 1 illustrates one type of prior art optical receiver that includes a demodulator comprising an asymmetric Mach-Zehnder interferometer with an optical delay in one arm.

FIG. 1 illustrates one type of prior art optical receiver 100 that includes a demodulator 102 comprising an asymmetric Mach-Zehnder interferometer with an optical delay 104 in one arm. That is, the demodulator 102 is a delay-interferometer (DI) type demodulator, which can be constructed from asymmetric Mach-Zehnder- or Michelson-type interferometers having a differential delay. The receiver 100 also includes a first 106 and second optical detector 108 that are coupled to respective ones of the constructive and destructive output ports of the demodulator 102. Until recently, it was widely accepted that the best performances can be achieved in demodulators comprising delay interferometers with differential delays that are equal to $\Delta t=nB^{-1}$, where n is an integer number and B is the symbol rate.

There is currently a desire to transmit data streams with data rates higher than 10 Gb/s through spectrally narrow channels. For example, currently it is highly desirable to utilize commercial 10 Gb/s rate data channels in existing fiber optic network infrastructures to transmit 43 Gb/s data rate signals. Simple OOK data modulation formats can not be used to transmit 43 Gb/s data rate signals through commercial 10 Gb/s rate data channels in existing fiber optic network infrastructures because the quality of these high data rate signals will be severely deteriorated in the narrow spectrum filter used in add/drop filters, multiplexers, and demultiplexers along the optical line.

Figure 2:
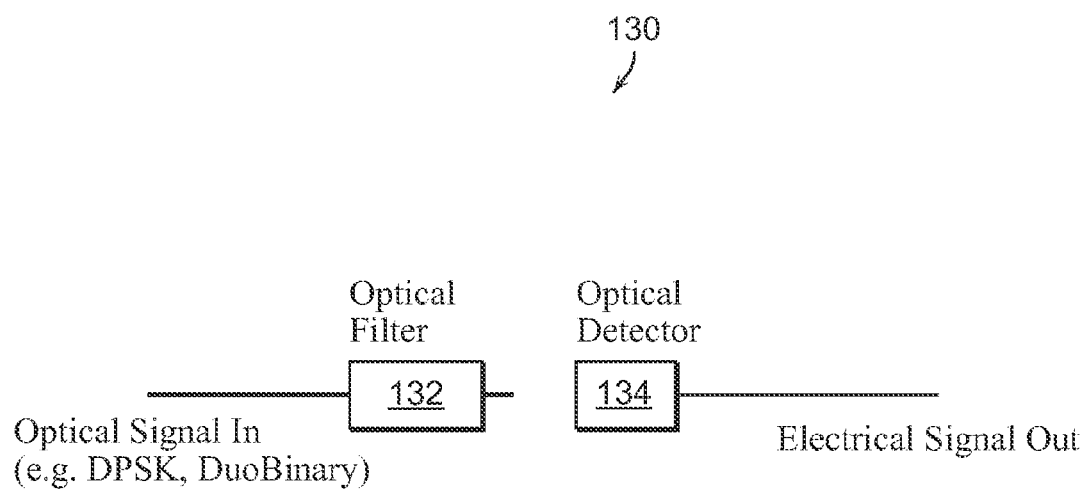
FIG. 2 illustrates another type of prior art optical receiver that includes an optical filter and an optical detector.

FIG. 2 illustrates another type of prior art optical receiver 130 that includes an optical filter 132 and an optical detector 134. It is well-known that a single optical filter can demodulate phase encoded data. See, for example, F. Jacobsson, "DPSK Modulation Format for Optical Communication Using FBG Demodulator", Msc Thesis, Depart. Science and Technology Linköpings University. Also, see I. Lyubomirsky and B. Pitchumani, "Impact of Optical Filtering on Duobinary Transmission", IEEE Photon. Technol. Lett. 16, 1969 (2004). Using a single optical filter is typically a relatively simple and inexpensive way to demodulate signals. However, it has been demonstrated theoretically and experimentally, that ordinary filters, such as Gaussian, flat-top etc., yield performances that are significantly inferior to demodulators including delay interferometers.

The primary motivation to add optical filters to the detector appears to be to implement the duobinary (DB) protocol optically instead of electrically. In typical duobinary devices, the laser is modulated by an electrical signal, which is filtered by an electrical filter. In some prior art systems, the electrical filter is replaced by an optical filter, which can be placed either at the transmitter or at the receiver end of the system. See, for example, U.S. Pat. No. 6,947,206 issued on Sep. 20, 2005, to S. Tsadka, et al., and entitled "All-Optical, Tunable Regenerator, Reshaper and Wavelength Converter." Duobinary systems are less susceptible to different kinds of dispersion (e.g. chromatic, polarization, etc.). However, the performance of duobinary systems is more dependent upon the optical signal-to-noise ratios than DPSK systems.

Figure 3:
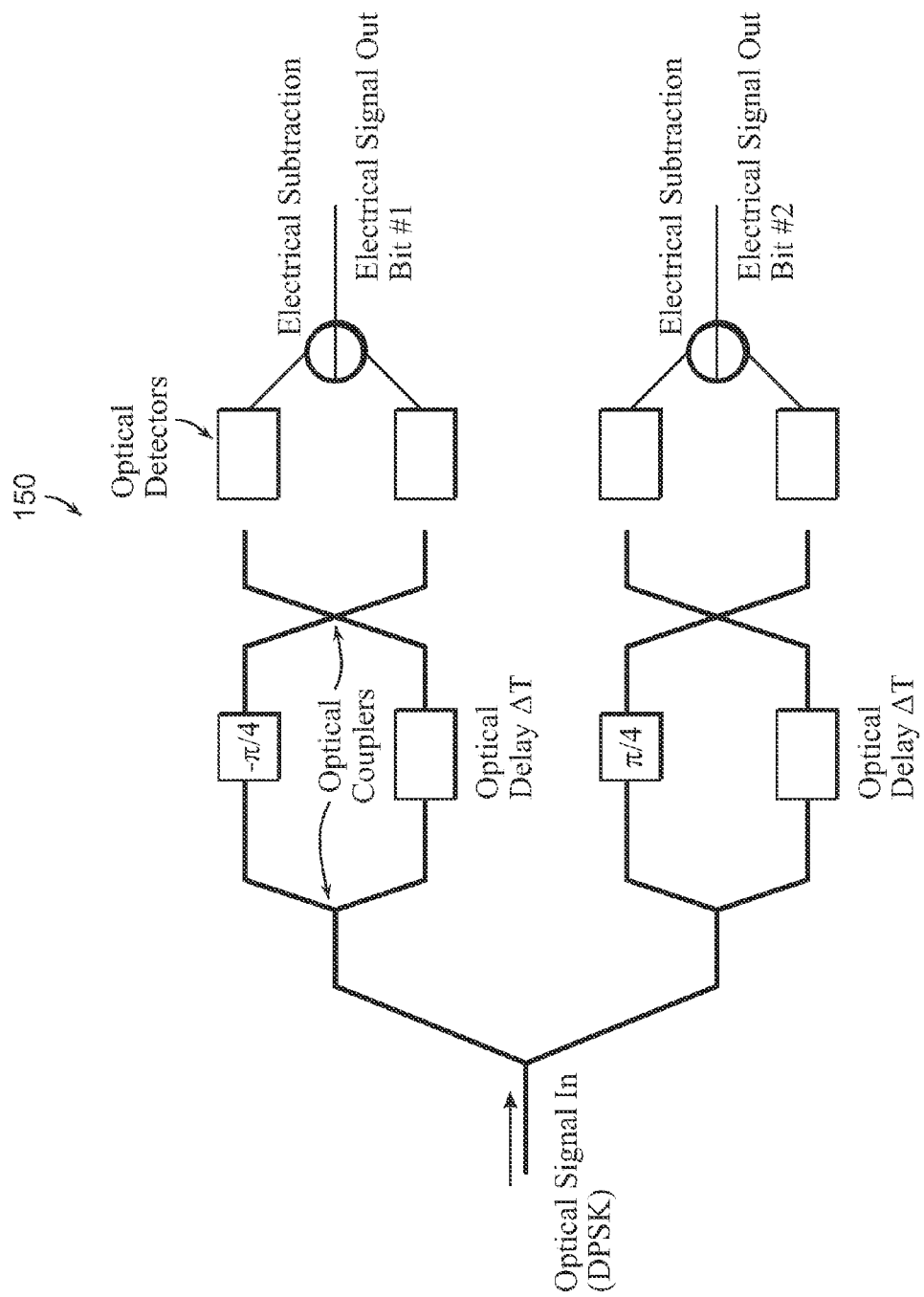
FIG. 3 illustrates a prior art Differential Quadrature Phased Shift Keying (DQPSK) optical receiver.

FIG. 3 illustrates a prior art Differential Quadrature Phased Shift Keying (DQPSK) optical receiver 150. The Differential Quadrature Phased Shift Keying modulation format can be used to transmit data at data rates that are higher than 10 Gb/s. The DQPSK format can transmit both RZ and NRZ data formats. Each DQPSK symbol carries two bits of information and, therefore, the symbol rate is half the symbol rate (in terms of bit rates) of an equivalent DPSK symbol rate. Consequently, the spectral width of DQPSK signals is half the spectral width of the equivalent DPSK signal. Therefore, DQPSK modulated optical signals are less susceptible to chromatic and polarization mode dispersions. Thus, DQPSK modulated optical signals can propagate through spectrally narrower channels. The DQPSK modulated optical signals, however, are considerably more complicated and more expensive to generate and demodulate than conventional DPSK signals.

Recently it was demonstrated both experimentally and theoretically (with numerical simulations) that the undesirable effects of the spectrally narrow optical filters can be partially compensated by using a delay interferometer with a differential delay that is smaller than the symbol time slot, $\Delta T<B^{-1}$. In other words, the undesirable effects of spectrally narrow optical filters can be mitigated by using a delay interferometer with a Free Spectral Range (FSR) that is larger than the symbol rate, i.e., FSR>B. See, for example, B. Mikkelsen, C. Rasmussen, P. Mamyshev, and F. Liu, "Partial DPSK with Excellent Filter Tolerance and OSNR Sensitivity," Electronics Letters, vol. 42, pp. 1363-5, 2006. Also, see C. Malouin, J. Bennike, and T. Schmidt, "Differential Phase-Shift Keying Receiver Design Applied to Strong Optical Filtering," IEEE Journal of Lightwave Technology, vol. 25, pp. 3536-3542, 2007 and B. Mikkelsen, P. Mamyshev, C. Rasmussen, and F. Liu, "Partial DPSK (PDPSK) transmission systems," U.S. Patent Publication No. 2007/0196110 A1. In addition, see I. Lyubomirsky and C-C. Chien, "DPSK Demodulation Based on Optical Discriminator Filter," IEEE Photon. Technol. Lett. 17, 492 (2005).

Known receivers using delay interferometers with FSR>B and known receivers using filters are only two special cases of a broad class of receivers that retrieve information from phase data and improve the signal quality. All of these known receivers suffer from deterioration along the optical line, due to narrow spectral filtering, dispersion, and numerous other signal impairments.

The present invention relates to demodulation methods and apparatus that can achieve optimal performance. In one aspect of the present invention, an incoming phase modulated optical signal is split into two or more channels. Each of the two or more channels is then passed through a specially designed optical filter that converts the phase data to amplitude data and that also regenerate the data and mitigates impairments in the signal.

In various embodiments, a demodulation filter according to the present is a periodic filter that supports incoming signals in any wavelength in the desired band. For example, the periodic filter can support incoming signals in the C and/or L bands. A receiver according to the present invention decouples the demodulation function from the regeneration function. In addition, the constructive and destructive channels use different filter shapes to mitigate signal impairments.

Figure 4:
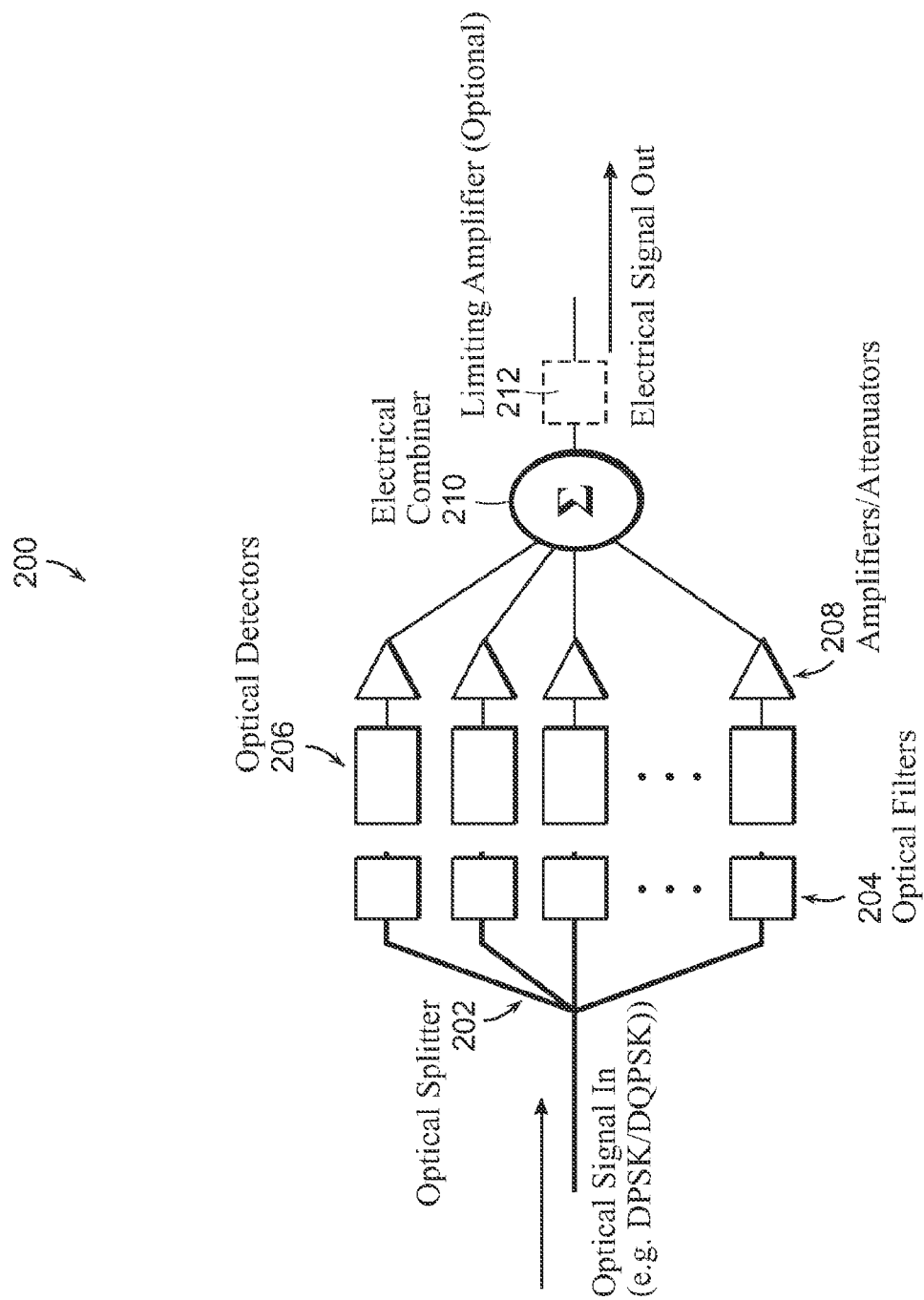
FIG. 4 illustrates one embodiment of a DPSK/DQPSK optical receiver according to the present invention that includes optical filters in the demodulator section.

FIG. 4 illustrates one embodiment of a DPSK/DQPSK optical receiver 200 according to the present invention that uses optical filters in the demodulator section. The receiver 200 includes a splitter 202 that separates the received signal into a plurality of received signals. The splitter 202 is not a simple 1/N splitter that is used in prior art receivers. Instead, the splitter 202 is a device that split the optical power of the received signal in a predetermined ratio that is typically not equal to the 50:50 splitting ratio which is used in prior art receivers. Receivers according to the present invention can include a splitter 202 with an almost unlimited number of different splitting ratios C:(1–C). See, for example, the embodiments shown in FIGS. 8A-8C. The splitter 202 can have either a fixed or an operator variable power splitting ratio.

Optical inputs of a plurality of optical filters 204 are optically coupled to the outputs of the splitter 202. That is, an input of a respective one of the plurality of optical filters 204 is optically coupled to a respective one of the plurality of optical outputs of the splitter 202. Each of the plurality of optical filters passes a filtered optical signal.

In addition, inputs of a plurality of optical detectors 206 are optically coupled to the outputs of the plurality of filters 204. That is, an optical input of a respective one of the plurality of optical detectors 206 is optically coupled to an output of a respective one of the plurality of filters 204. Each of the plurality of optical detectors 206 generates an electrical detection signal.

Each of the plurality of channels can require different processing because each of the plurality of channels can have a different average power. A plurality of amplifiers 208 is used to process the electrical detection signal. Inputs to the plurality of amplifiers 208 are electrically coupled to the outputs of the plurality of optical detectors 206. That is, an output of a respective one of the plurality of optical detectors 206 is electrically coupled to an input of a respective one of the plurality of amplifiers 208. It should be understood that the term "amplifier" as used herein is a device that can either provide gain and loss depending on its operating parameters.

Including an optical amplifier in each of the channels in the demodulator section of the receiver has numerous advantageous. One advantage is that the plurality of amplifiers 208 can be used to provide enough gain to overcome the internal loss associated with the plurality of filters 204. In addition, the ability to adjust the gain in particular channels can be used to reduce signal chirping present in the received optical signal, which can improve the receiver performance. See, for example, U.S. Pat. No. 6,947,206 issued on Sep. 20, 2005 to S. Tsadka, S. Ben-Ezra, H. Chayet, and N. Shahar, and entitled "All-optical, Tunable Regenerator, Reshaper and Wavelength Converter."

Furthermore, including an optical amplifier in each of the channels provides the operator with the capability of adjusting the gain in particular optical channels. Adjusting the gain in particular channels is useful to balance the power transients from the line that cause the plurality of filters 204 (or delay interferometers in other embodiments) and/or the plurality of optical detectors 206 to deviate from their optimal point of operation. Thus, the ability to adjust the gain in particular optical channels can not only reduce signal degradation caused by spectrally narrowing the optical line, but can also reduce signal degradation resulting from other optical signal degrading phenomena, such as chromatic dispersion, polarization-mode dispersion, and numerous other nonlinear effects.

The electrical outputs of the plurality of amplifiers 208 are coupled to a plurality of inputs of an electrical combiner 210. That is, an output of a respective one of the plurality of amplifiers 208 is electrically connected to a respective one of the plurality of inputs of the electrical combiner 210. The electrical combiner 210 combines the amplified electrical detection signals generated by the plurality of optical amplifiers 208 into a combined reception signal. In some embodiments, a limiting amplifier 212 is used to electronically limit the magnitude of the combined reception signal so that the magnitude of the combined reception signal does not exceed signal limits of downstream electronics.

In operation, a method of demodulating a DPSK/DQPSK modulated optical signal includes splitting a received DPSK/DQPSK modulated optical signal into a plurality of received optical signals according to an optical power splitting ratio. Each of the plurality of received optical signals is then filtered. Each of the plurality of filtered optical signals is then detected and a plurality of electrical detection signal is generated where each of the plurality of electrical detection signals has a power that is related to a power of a respective filtered optical signal. Each of the plurality of electrical detection signals is then amplified with a predetermined gain or loss. Each of the plurality of amplified electrical detection signals is then combined into a combined reception signal. In some embodiments, the amplitude of the combined reception signal is limited.

In various embodiments, the step of amplifying the electrical detection signal with the predetermined gain or loss is performed to improve or to optimize performance by achieving at least one of the following: (1) reducing effects of chirping in the received DPSK/DQPSK modulated optical signal on the combined reception signal; (2) reducing effects resulting from at least one of chromatic dispersion and polarization-mode dispersion in the received DPSK/DQPSK modulated optical signal on the combined reception signal; and (3) reducing effects of spectrally narrowing in the received DPSK/DQPSK modulated optical signal on the combined reception signal.

Figure 5:
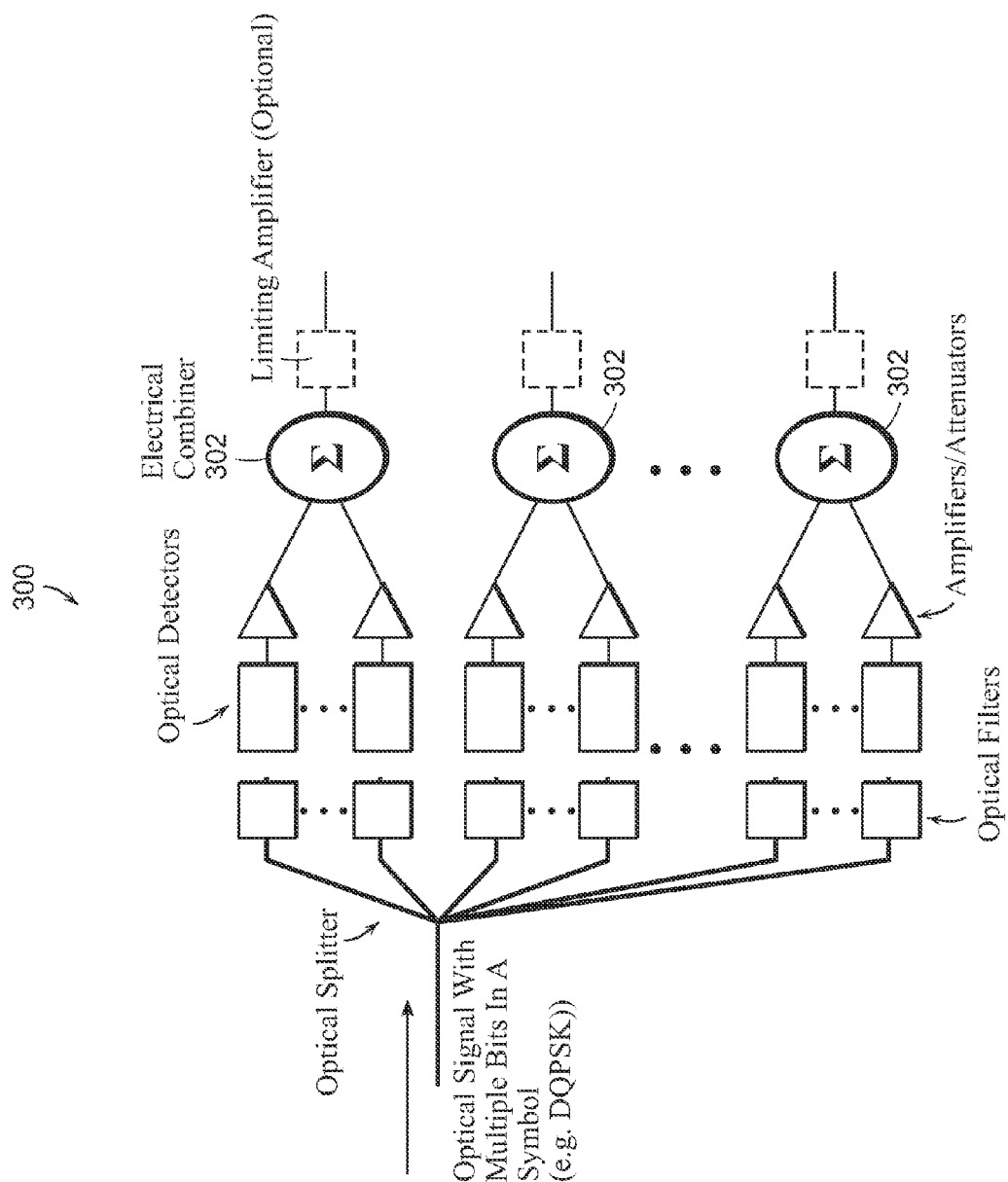
FIG. 5 illustrates one embodiment of a DPSK/DQPSK optical receiver according to the present invention that uses optical filters in the demodulator section and that includes a plurality of electrical combiners which independently combine portions of the received signal.

FIG. 5 illustrates one embodiment of a DPSK/DQPSK optical receiver 300 according to the present invention that uses optical filters in the demodulator section and that includes a plurality of electrical combiners 302 which independently combine portions of the received signal. The DPSK/DQPSK receiver 300 is similar to the DPSK/DQPSK receiver 200 that was described in connection with FIG. 4. However, each of the plurality of electrical combiners 302 combines at least two of the detected and independently amplified received signal. One skilled in the art will appreciate that if the signal protocol contains more than one bit per symbol, the entire system should be multiplied (using different filters) by the number of bits.

Figure 6:
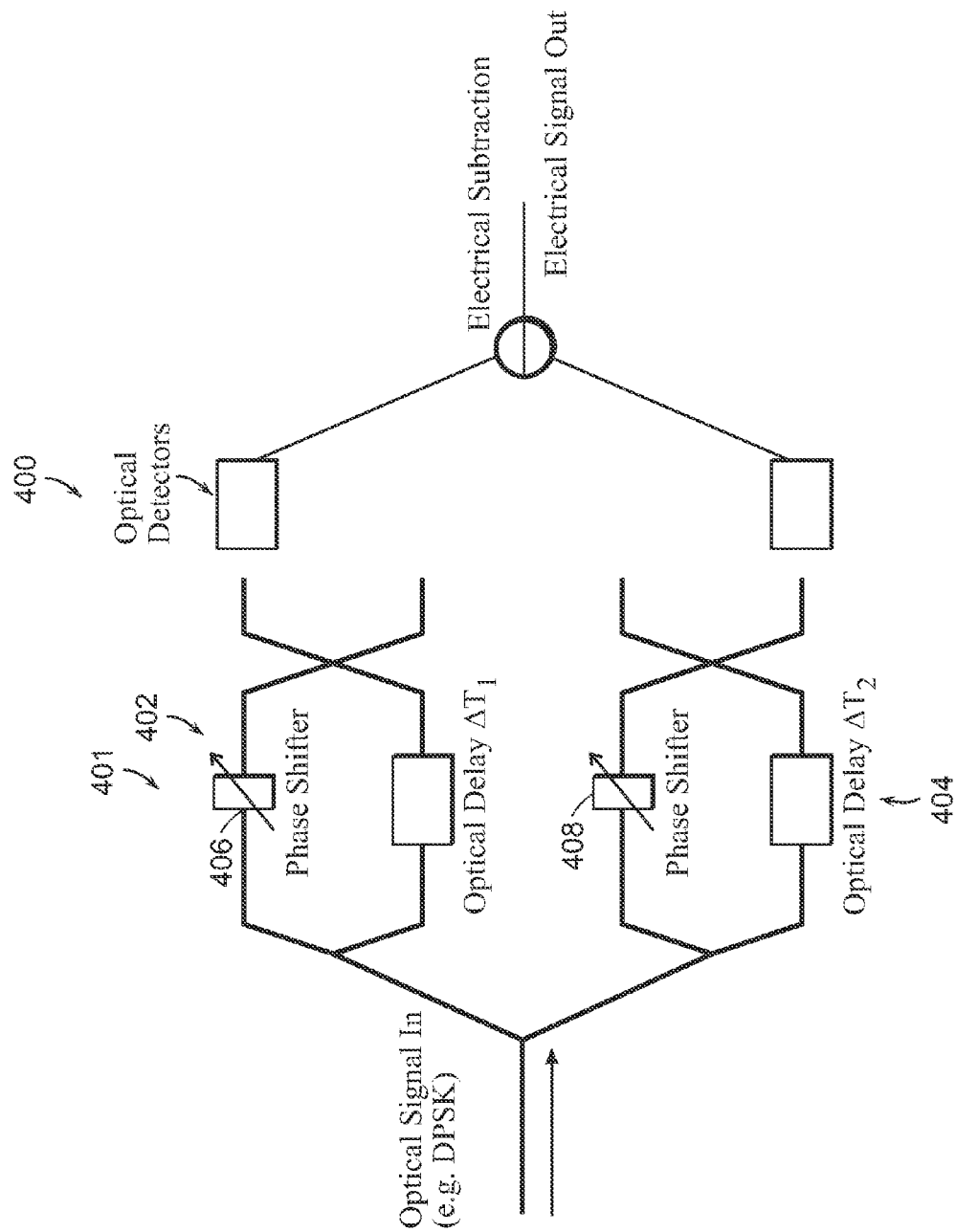
FIG. 6 illustrates one embodiment of a DPSK/DQPSK optical receiver according to the present invention that includes a demodulator section that uses delay interferometers with different optical delays and variable phase shifters.

FIG. 6 illustrates one embodiment of a DPSK/DQPSK optical receiver 400 according to the present invention that includes a demodulator section that uses delay interferometers 402, 404 with different optical delays and variable phase shifters 406, 408. The DPSK/DQPSK receiver 400 is similar to the prior art DPSK/DQPSK receiver 150 described in connection with FIG. 3. However, one difference is that the DPSK/DQPSK receiver 400 includes a demodulator section 401 having delay interferometers 402, 404 with different optical delays and that also includes variable phase shifters 406, 408.

Including different optical delays and variable phase shifters in the delay interferometers 402, 404 provides the operator with the ability separately tune the free spectral range and phase shift of each of the delay interferometers 402, 404 to improve or to optimize performance. In various embodiments, the free spectral range and phase shift of each of the delay interferometers 402, 404 can be tuned to improve performance by achieving at least one of the following: (1) reducing effects of chirping in the received DPSK/DQPSK modulated optical signal on the combined reception signal; (2) reducing effects resulting from at least one of chromatic dispersion and polarization-mode dispersion in the received DPSK/DQPSK modulated optical signal on the combined reception signal; and (3) reducing effects of spectrally narrowing in the received DPSK/DQPSK modulated optical signal on the combined reception signal.

Figure 7:
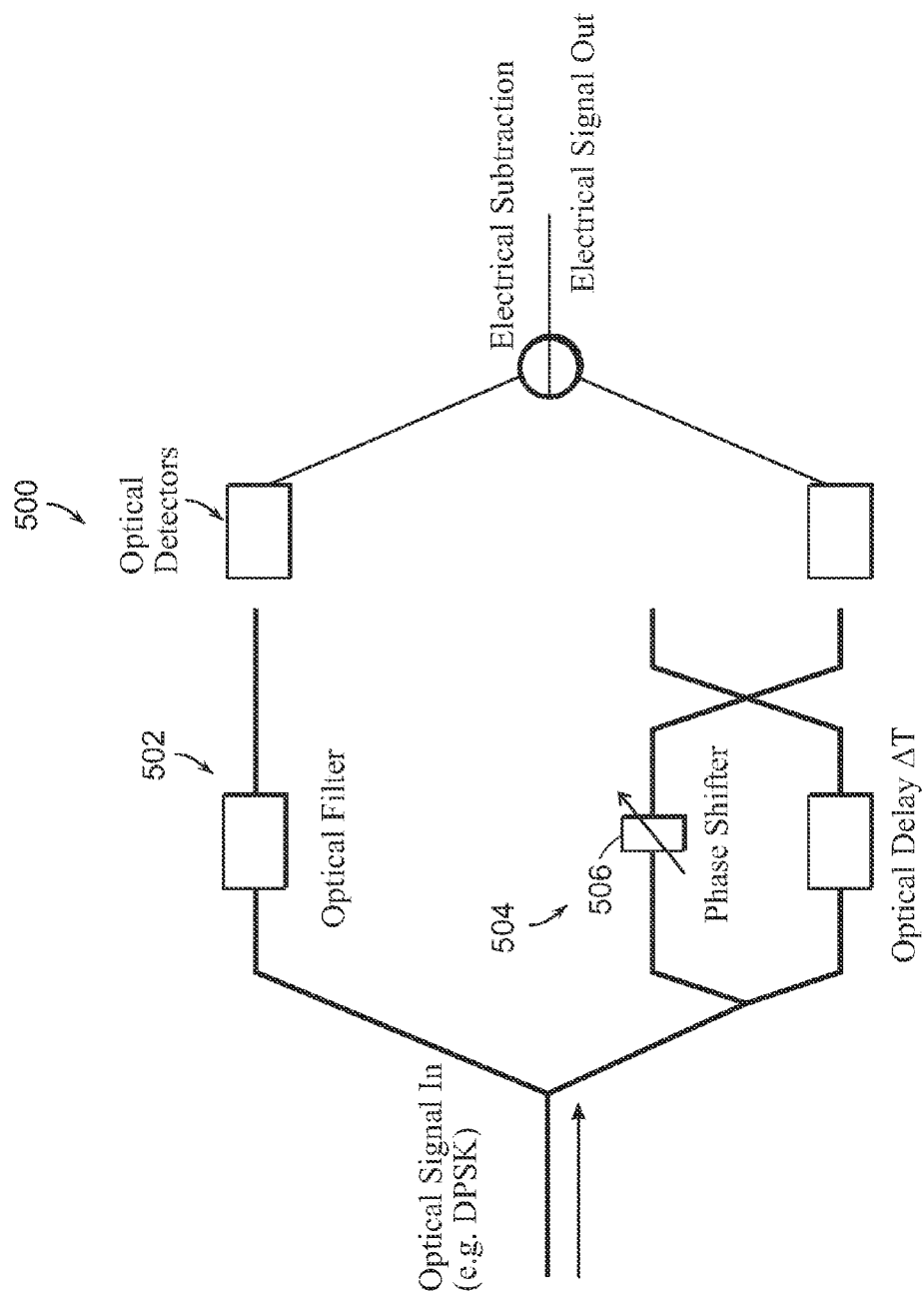
FIG. 7 illustrates one embodiment of a DPSK/DQPSK optical receiver according to the present invention that includes a demodulator section that uses both an optical filter and a delay interferometer with a variable phase shifter.

FIG. 7 illustrates one embodiment of a DPSK/DQPSK optical receiver 500 according to the present invention that includes a demodulator section that uses both an optical filter 502 and a delay interferometer 504 with a variable phase shifter 506. The DPSK/DQPSK receiver 500 is similar to the DPSK/DQPSK receiver 400 that was described in connection with FIG. 6, but the receiver 400 includes an optical filter 502 instead of a second delay interferometer. Including both the optical filter 502 and the delay interferometer 504 with the variable phase shifter 506 provides the operator with the ability to improve or to optimize performance.

In various embodiments, the phase shift and the optical delay of the delay interferometers 504 is tuned to improve performance by achieving at least one of the following: (1) reducing effects of chirping in the received DPSK/DQPSK modulated optical signal on the combined reception signal; (2) reducing effects resulting from at least one of chromatic dispersion and polarization-mode dispersion in the received DPSK/DQPSK modulated optical signal on the combined reception signal; and (3) reducing effects of spectrally narrowing in the received DPSK/DQPSK modulated optical signal on the combined reception signal.

Figure 8A:
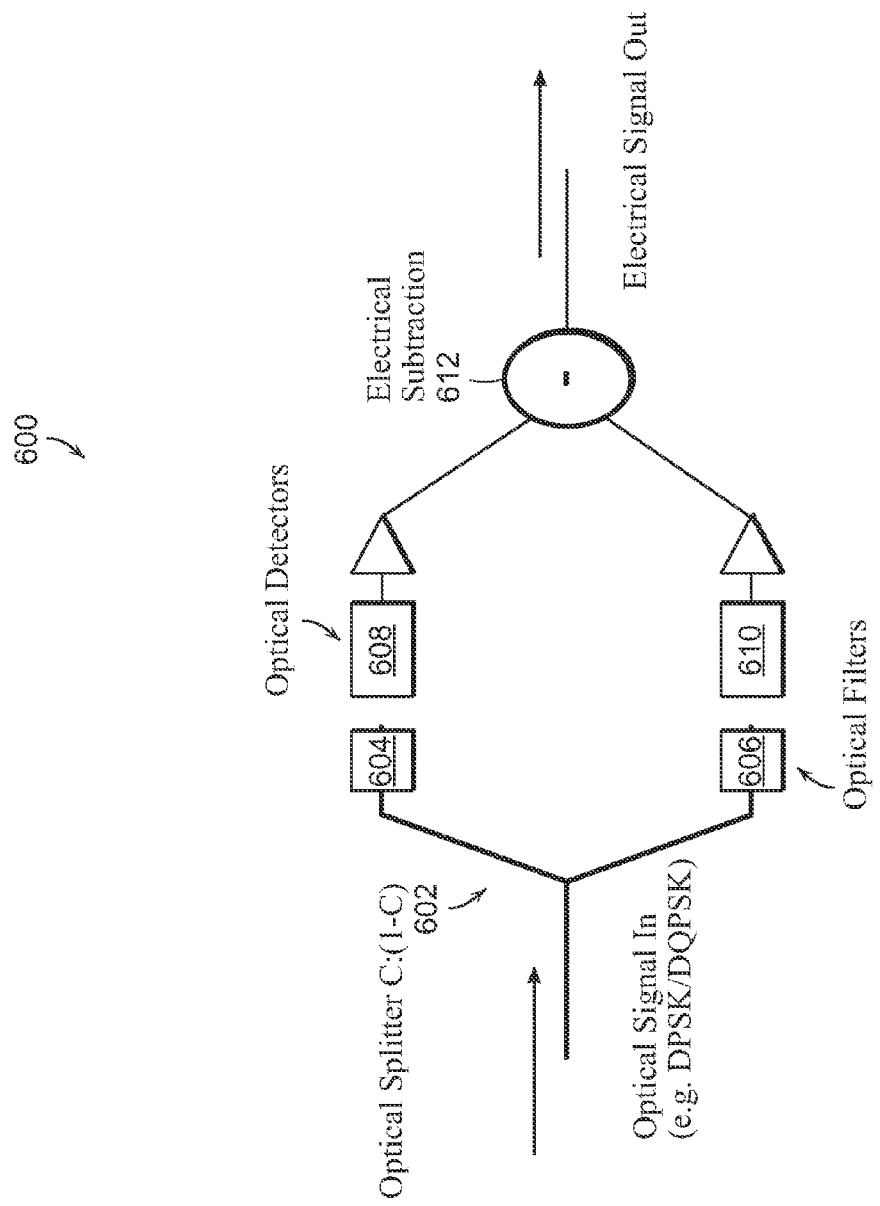
FIG. 8A illustrates a DPSK/DQPSK optical receiver that includes a splitter with a non-equal splitting ratio and optical filters in the demodulation section.
Figure 8B:
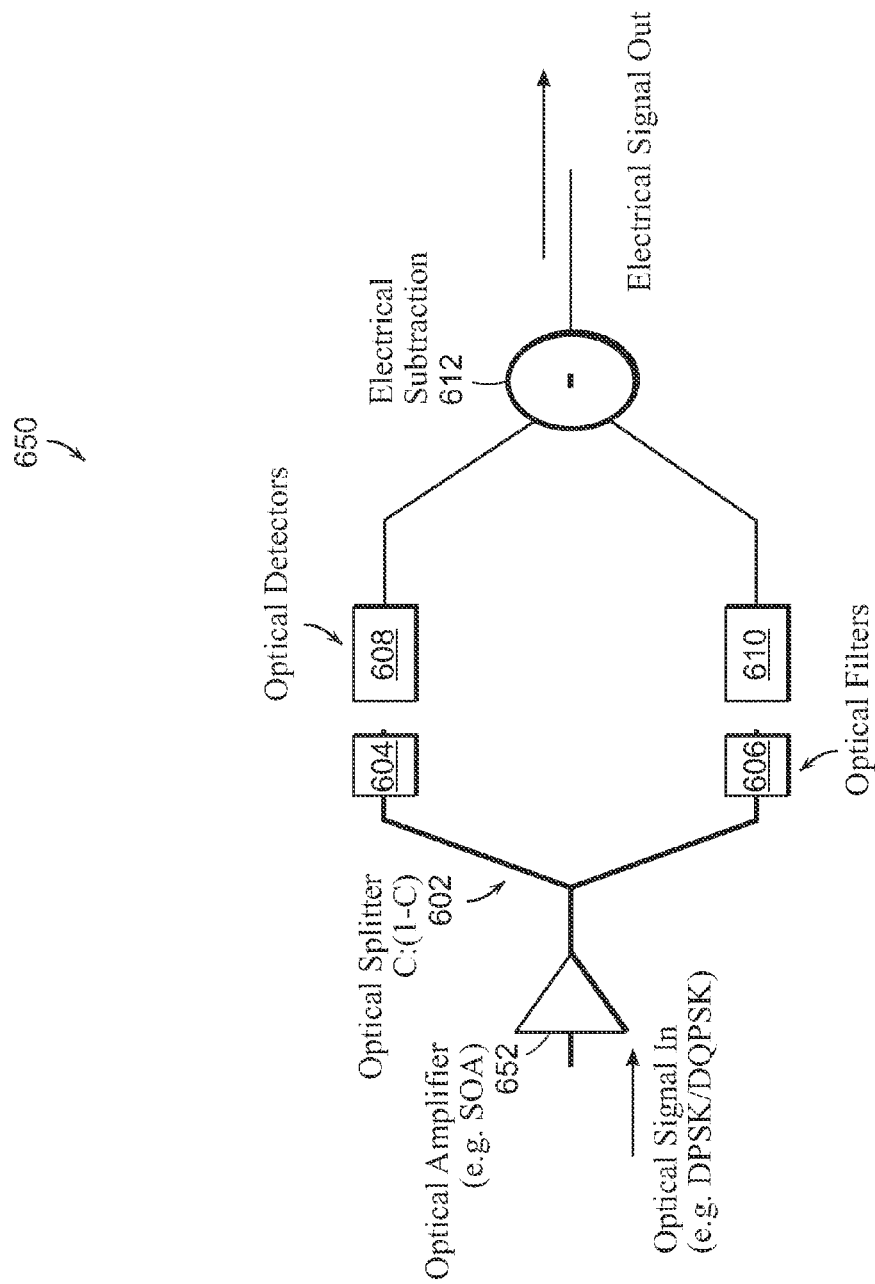
FIG. 8B illustrates another DPSK/DQPSK optical receiver that includes a demodulator comprising optical filters coupled with non-equal splitting ratios.
Figure 8C:
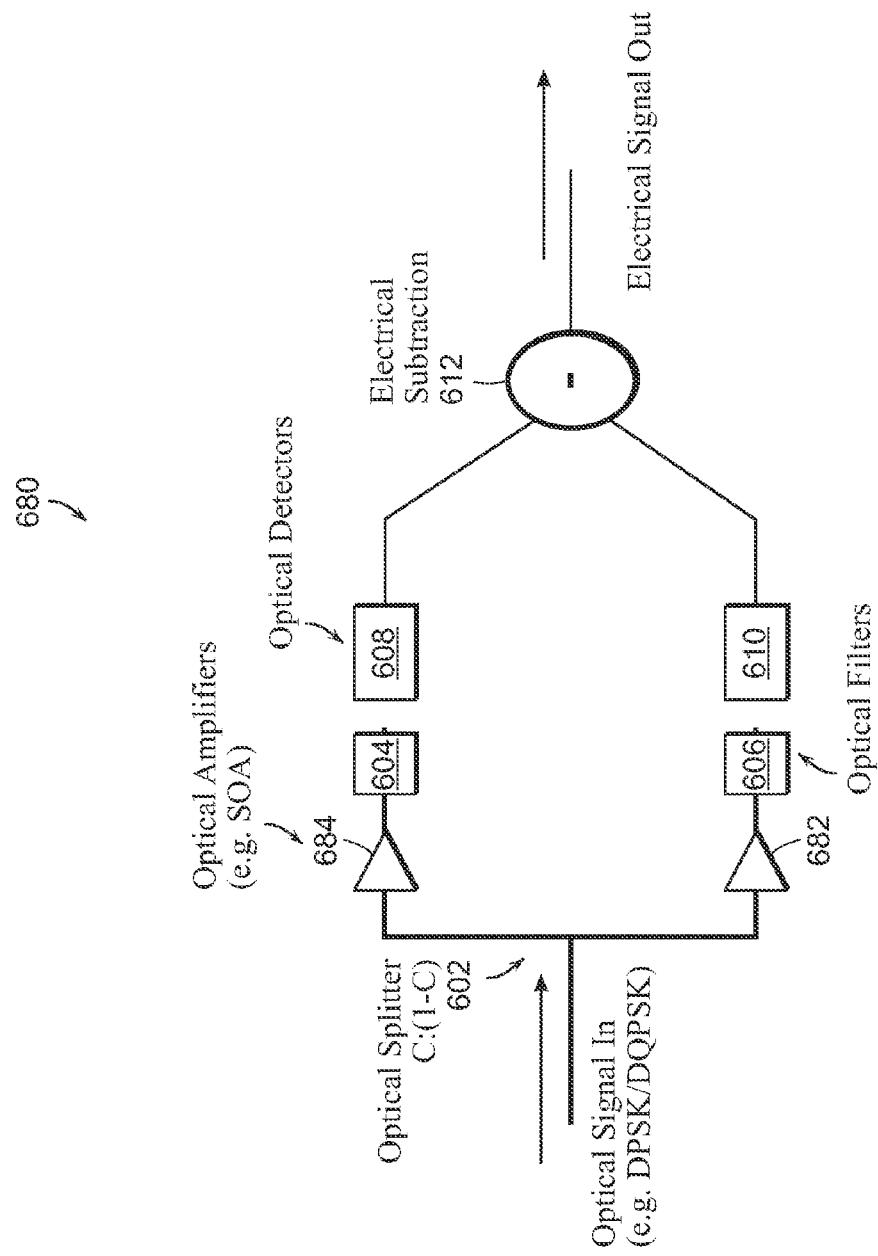
FIG. 8C illustrates another DPSK/DQPSK optical receiver that includes a demodulator comprising optical filters coupled with non-equal splitting ratios.

FIGS. 8A-8C illustrate embodiments of DPSK/DQPSK receivers that include a demodulator comprising optical filters coupled with non-equal splitting ratios. FIG. 8A illustrates a DPSK/DQPSK optical receiver 600 that includes a splitter 602 with a non-equal splitting ratio and optical filters in the demodulation section. One skilled in the art will appreciate that the splitter 602 can have numerous splitting ratios. A respective one of the first and second outputs of the splitter 602 is optically coupled to an input of a respective one of the first 604 and second optical filter 606. Outputs of respective ones of the first 604 and second optical filter 606 are coupled to inputs of respective ones of the first 608 and second optical detectors 610. The electrical outputs of the first 608 and second optical detector 610 are electrically connected to a combiner 612 that generates a difference signal.

In various embodiments, the splitting ratio of the splitter 602 is chosen to improve performance by achieving at least one of the following: (1) reducing effects of chirping in the received DPSK/DQPSK modulated optical signal on the combined reception signal; (2) reducing effects resulting from at least one of chromatic dispersion and polarization-mode dispersion in the received DPSK/DQPSK modulated optical signal on the combined reception signal; and (3) reducing effects of spectrally narrowing in the received DPSK/DQPSK modulated optical signal on the combined reception signal.

FIG. 8B illustrates another DPSK/DQPSK optical receiver 650 that includes a demodulator comprising optical filters coupled with non-equal splitting ratios. The receiver 650 is similar to the DPSK/DQPSK receiver that was described in connection with FIG. 8A. However, the receiver 650 includes an optical amplifier 652 coupled to the input of the splitter 602. The gain of the optical amplifier 652 can be adjusted to improve performance by achieving at least one of the following: (1) reducing effects of chirping in the received DPSK/DQPSK modulated optical signal on the combined reception signal; (2) reducing effects resulting from at least one of chromatic dispersion and polarization-mode dispersion in the received DPSK/DQPSK modulated optical signal on the combined reception signal; and (3) reducing effects of spectrally narrowing in the received DPSK/DQPSK modulated optical signal on the combined reception signal.

FIG. 8C illustrates another DPSK/DQPSK optical receiver 680 that includes a demodulator comprising optical filters coupled with non-equal splitting ratios. The receiver 680 is similar to the DPSK/DQPSK receiver that was described in connection with FIG. 8A. However, the receiver 680 includes a first 682 and second optical amplifier 684 having inputs that are coupled to an output of a respective one of the first and second output of the splitter 602. The gain of the first 682 and second optical amplifier 684 can be adjusted to improve performance by achieving at least one of the following: (1) reducing effects of chirping in the received DPSK/DQPSK modulated optical signal on the combined reception signal; (2) reducing effects resulting from at least one of chromatic dispersion and polarization-mode dispersion in the received DPSK/DQPSK modulated optical signal on the combined reception signal; and (3) reducing effects of spectrally narrowing in the received DPSK/DQPSK modulated optical signal on the combined reception signal.

One skilled in the art will appreciate that there are numerous variations of the DPSK/DQPSK receiver according to the present invention. In particular, there is an almost unlimited number of possible configurations where the splitting ratio of the received signal deviates from a prior art 50:50 splitting ratio. Also, in various embodiments, optical amplifiers and/or optical attenuators can be included with each of the optical filters and/or delay interferometers.

In some embodiments, the DPSK/DQPSK receiver according to the present invention includes an interferometer with a destructive arm including a derivative filter (a spectrally triangular one) that is used to regenerate an optical RZ signal, which resembles the destructive part of a DPSK signal. See, for example, U.S. Pat. No. 6,947,206 issued on Sep. 20, 2005, to S. Tsadka, et al., and entitled "All-Optical, Tunable Regenerator, Reshaper and Wavelength Converter." In addition, in some embodiments, the DPSK/DQPSK receiver according to the present invention includes an interferometer with a constructive arm including a filter that mitigates the undesirable effects of the optical filtering.

Figure 9:
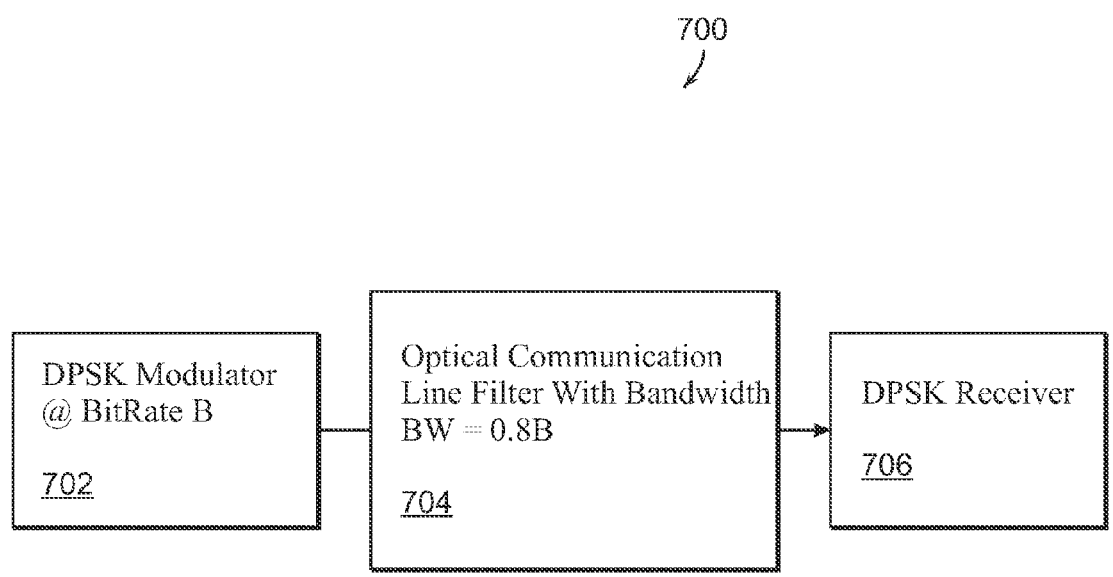
FIG. 9 illustrates a block diagram of a transmission system that is used to simulate prior art DPSK receivers and a DPSK receiver according to the present invention.

FIG. 9 illustrates a block diagram of a transmission system 700 that is used to simulate prior art DPSK receivers and a DPSK receiver according to the present invention. The transmission system 700 includes a DPSK transmitter 702 with a DPSK modulator that generates DPSK modulated data at bit rate B. In addition, the transmission system 700 includes an optical communication line 704 with an optical signal-to-noise ratio (OSNR) equal to 16.8 dB at a data rate of 43 Gb/s. The signal in the optical line passes through a Gaussian optical filter with Bandwidth BW=0.8 B, where B is the bit rate, which is equal to 43 Gb/s. The transmission system 700 also includes a receiver 706 that was simulated with different wavelengths in the optical C-band. Simulation data is presented in FIGS. 10-12 for the transmission system 700 with prior art receivers and is presented in FIGS. 14-15 for the transmission system 700 with the receiver according to the present invention.

Figure 10:
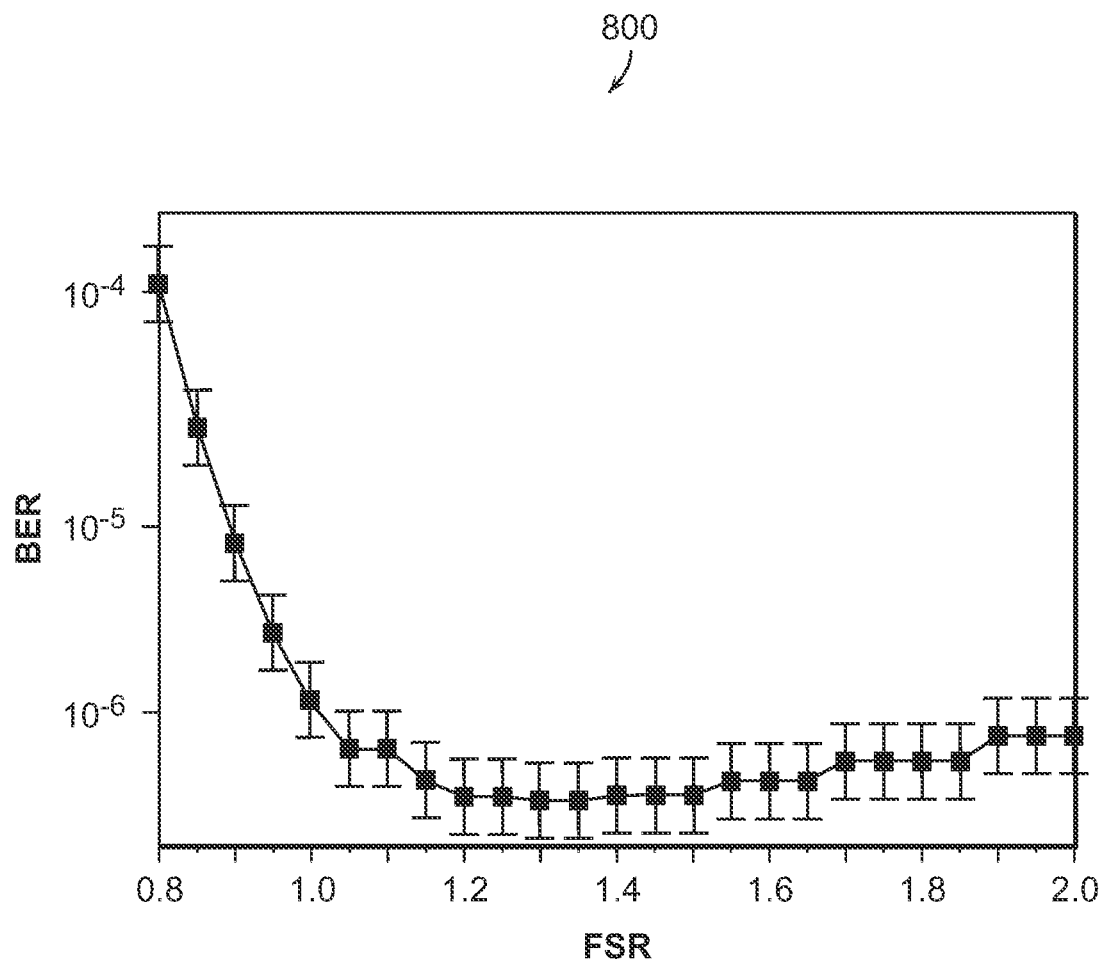
FIG. 10 illustrates a simulation of Bit Error Rate (BER) data as a function of the free spectral range of the prior art receiver shown in FIG. 1 with a demodulator based on a delay interferometer.

FIG. 10 illustrates a simulation of bit error rate (BER) data 800 as a function of the free spectral range of the prior art receiver shown in FIG. 1 with a demodulator based on a delay interferometer. The FSR data is normalized to the bit rate. That is, the FSR data is shown in units of B. The simulated bit error rate (BER) data indicates that the best BER is achieved for a FSR that is approximately 1.3 (in units of B). Thus, for a finite filter bandwidth (BW), the best performances are achieved when the FSR>1. These data are similar to other published simulation data. See, for example, B. Mikkelsen, C. Rasmussen, P. Mamyshev, and F. Liu, "Partial DPSK with excellent filter tolerance and OSNR sensitivity" Electronics Letters, vol. 42, pp. 1363-5, 2006. Also see C. Malouin, J. Bennike, and T. Schmidt, "Differential Phase-Shift Keying Receiver Design Applied to Strong Optical Filtering" IEEE Journal of Lightwave Technology, vol. 25, pp. 3536-3542, 2007. Also, see U.S. Patent Publication No. US2007/0196110 A1 to B. Mikkelsen, P. Mamyshev, C. Rasmussen, and F. Liu, entitled "Partial DPSK (PDPSK) transmission systems".

Figure 11:
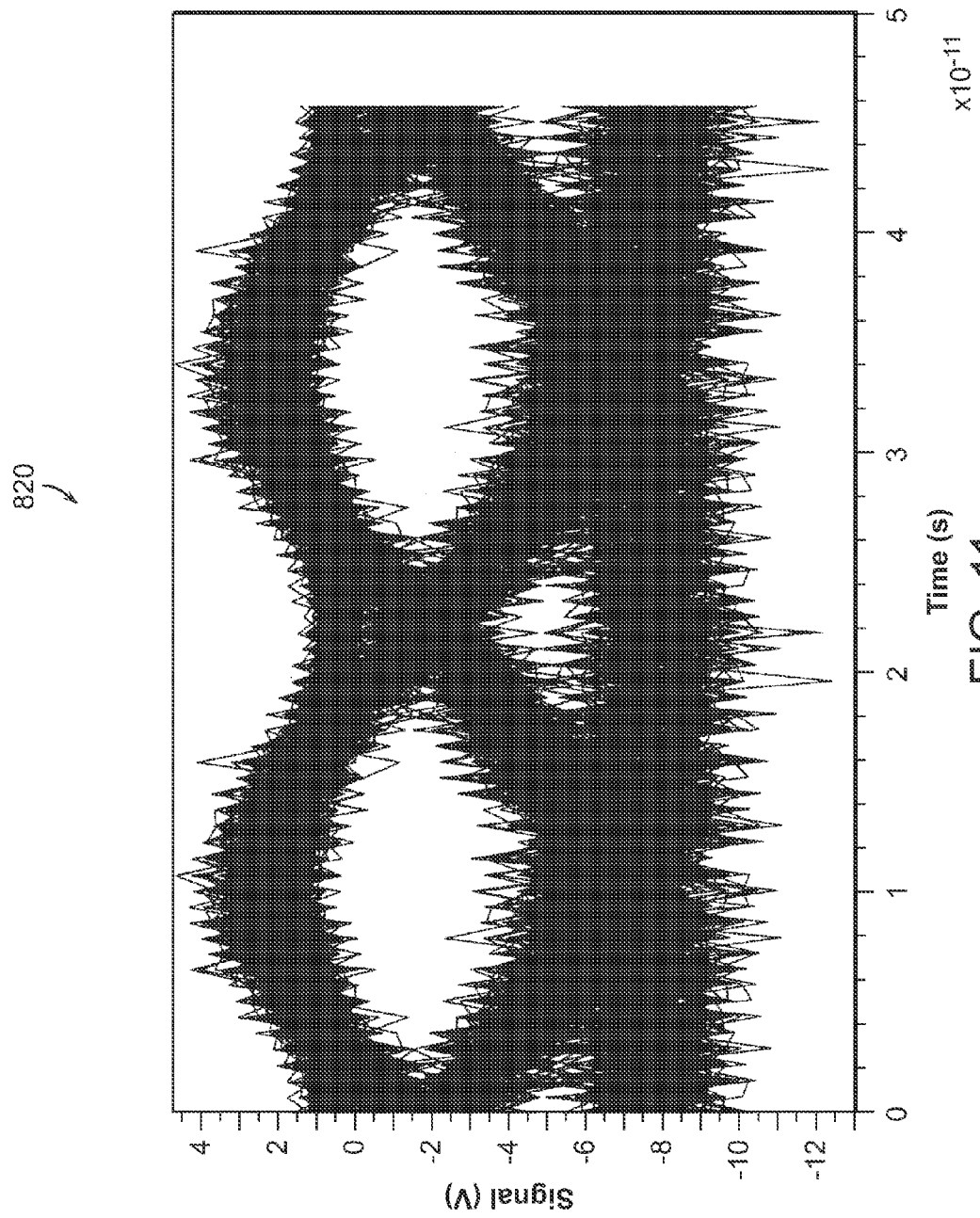
FIG. 11 illustrates a simulated eye-pattern for the receiver simulated in FIG. 10 with a FSR equal to 1.3, which corresponds to an optical bandwidth equal to 0.8 B.

FIG. 11 illustrates a simulated eye-pattern 820 for the receiver simulated in FIG. 10 with a FSR that is equal to 1.3, which corresponds to an optical bandwidth equal to 0.8 B.

Figure 12:
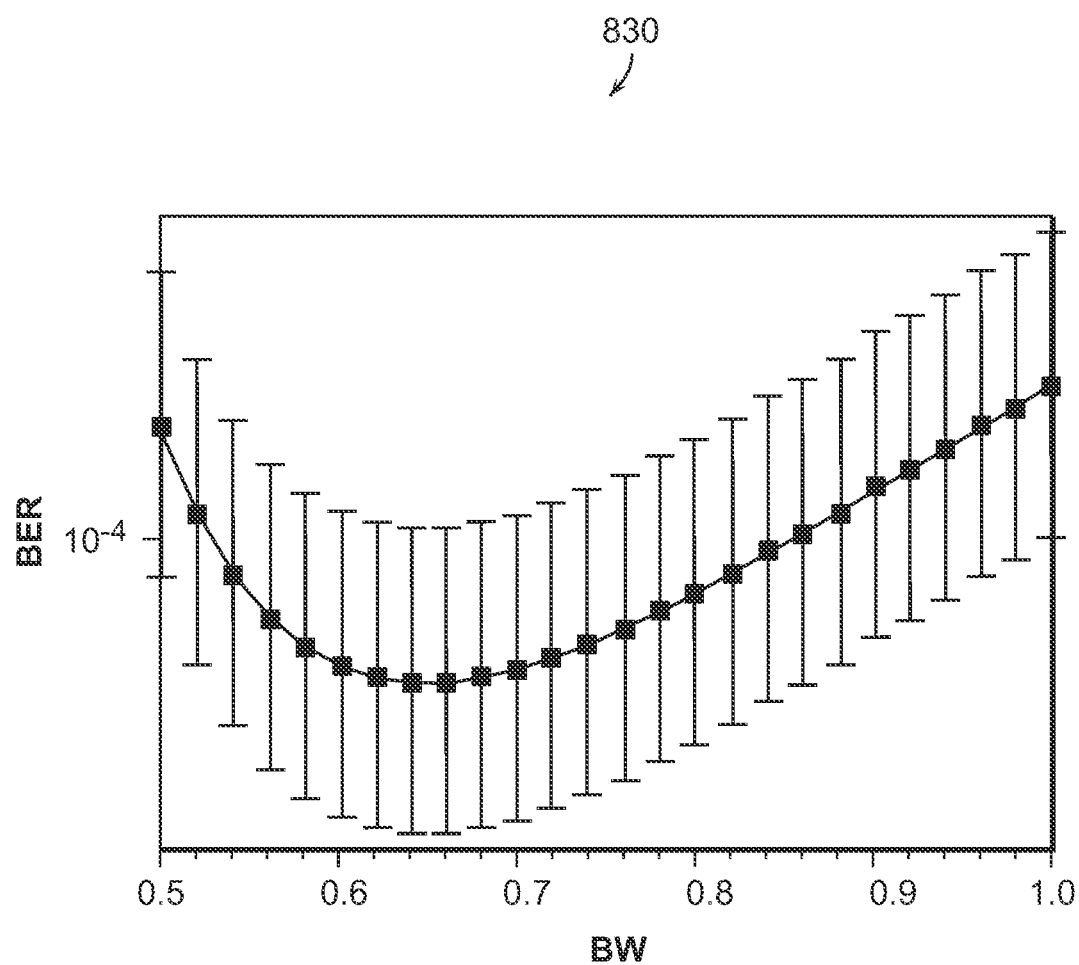
FIG. 12 illustrates a simulation of bit error rate data as a function of bandwidth for the prior art receiver shown in FIG. 2 with a filter based demodulator.

FIG. 12 illustrates a simulation of bit error rate data 830 as a function of bandwidth for the prior art receiver shown in FIG. 2 with a filter based demodulator. A Gaussian optical filter was used for the simulation. The data indicate that the best performances are achieved for BWs that are equal to about 0.65 (in units of B). The data also indicate that the best achievable BER is much worse than the BER which is achievable with the prior art receiver shown in FIG. 1.

Figure 13:
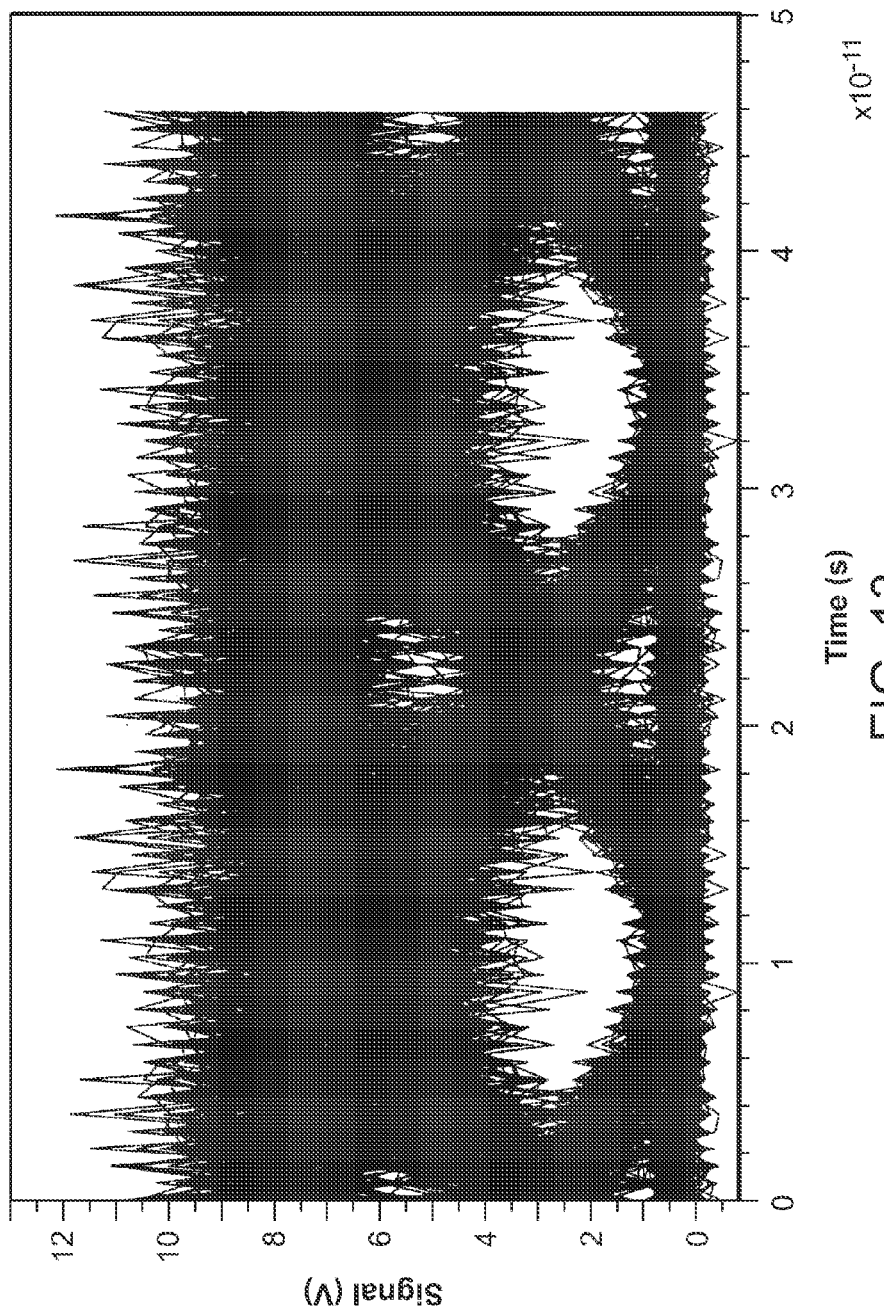
FIG. 13 illustrates a simulated eye-pattern for the receiver shown in FIG. 2 with a filter based demodulator having a bandwidth that is equal to 0.65 B.

FIG. 13 illustrates a simulated eye-pattern 840 for the receiver shown in FIG. 2 with a filter based demodulator having a bandwidth that is equal to 0.65 B. The simulated eye-pattern 840 indicates that the bit error rate for the receiver shown in FIG. 2 with the filter based demodulator having the bandwidth that is equal to 0.65 B is higher than the bit error rate for the receiver shown in FIG. 1 with the demodulator based on a delay interferometer having FSR equal to 1.3.

Figure 14A:
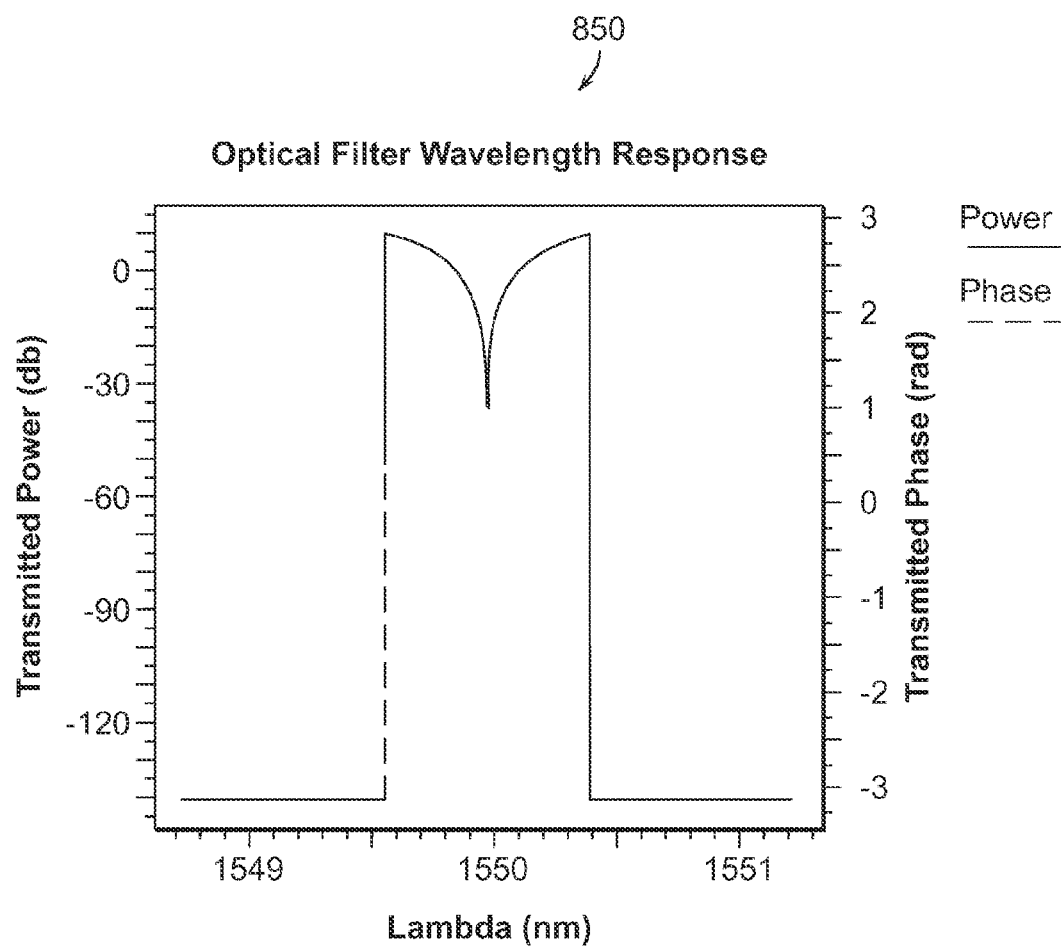
FIG. 14A illustrates the optical filter wavelength response of a first filter in the first arm of the receivers shown in FIGS. 8A-8C.
Figure 14B:
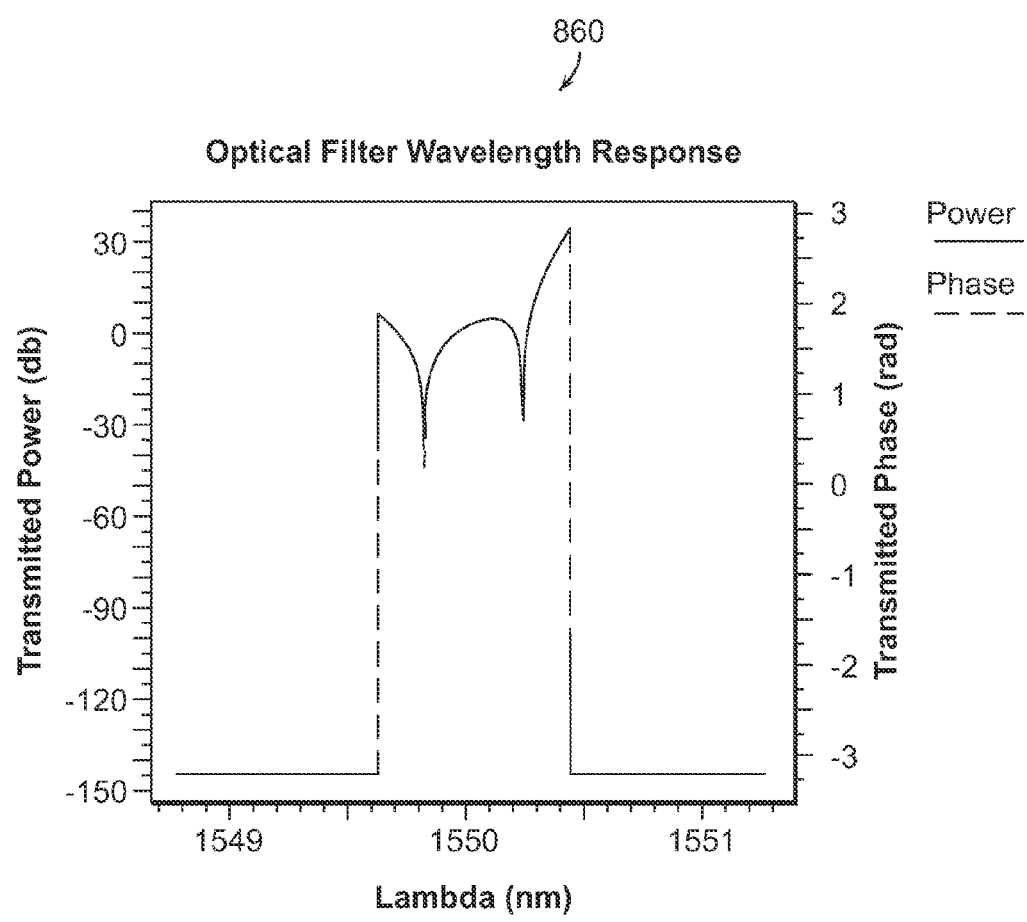
FIG. 14B illustrates the optical filter wavelength response of a second filter in the second arm of the receivers shown in FIGS. 8A-8C.

FIG. 14A-14B illustrates simulations for the receivers according to the present invention that are shown in FIGS. 8A-8C. FIG. 14A illustrates the optical filter wavelength response 850 of a first filter in the first arm of the receivers shown in FIGS. 8A-8C. FIG. 14B illustrates the optical filter wavelength response 860 of a second filter in the second arm of the receivers shown in FIGS. 8A-8C. The second filter was chosen to compensate for the optical filter in the line (and therefore was chosen to be an inverse Gaussian $\exp(Af^2)$). In addition, the second filter emulates the delay interferometer, and has a periodic cosine response, i.e., $\cos(2\pi f/FSR+\phi)$. Furthermore, the second filter has a cut higher noise frequency, and therefore, has a band-pass filter response that can be expressed by the following equation:

$$H(f) = \begin{cases} \cos[\pi B(f-f_0)]\exp\{2[(f-f_0+0.4B)/B]^2\} & |f-f_0| < 0.9B \\ 0 & \text{else} \end{cases},$$

where B is the Bit-rate and $f_0$ is the laser's frequency.

Figure 15:
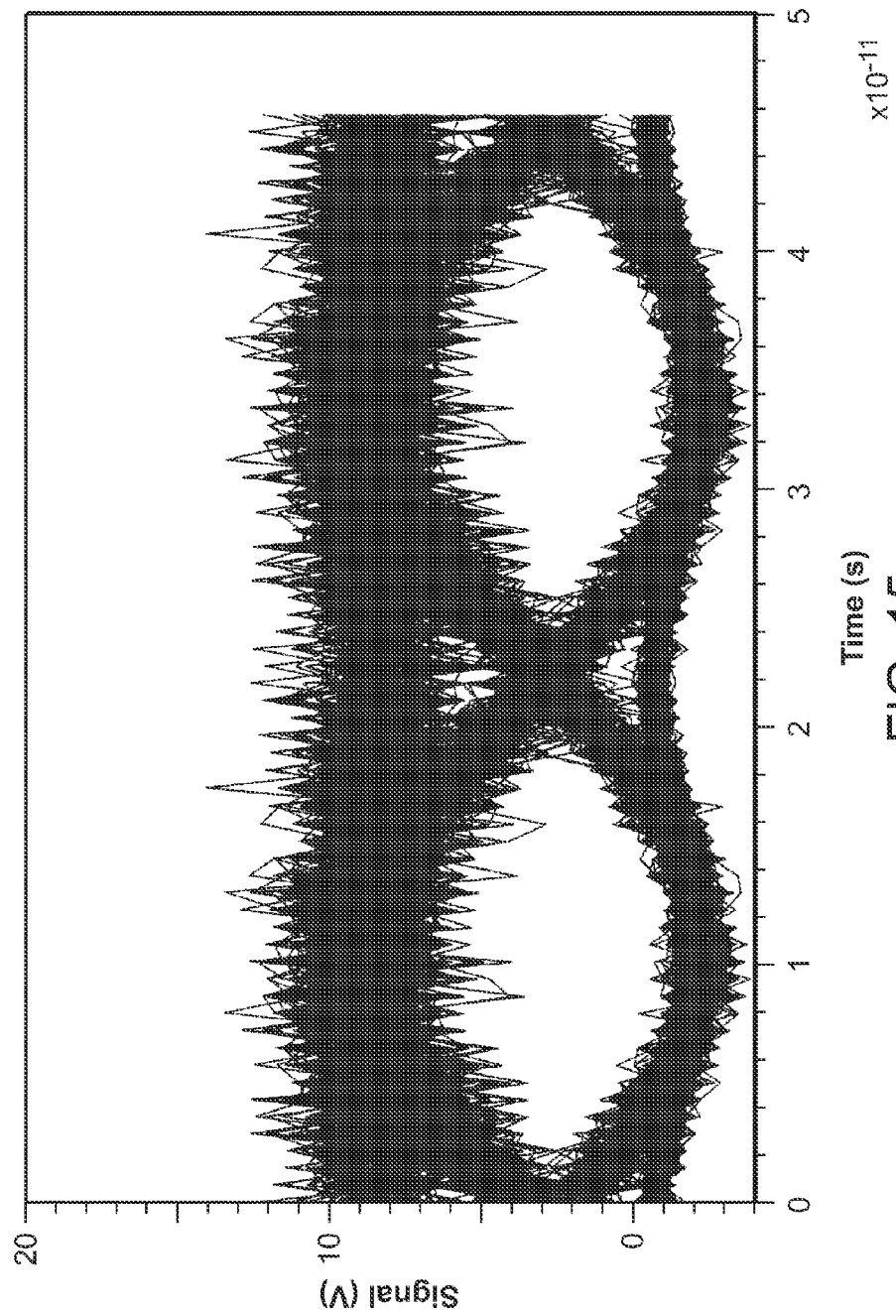
FIG. 15 illustrates data for a simulated eye-pattern for the receiver shown in FIGS. 8A-8C with the filters described in connection with FIGS. 14A-14B.

FIG. 15 illustrates data for a simulated eye-pattern 870 for the receiver shown in FIGS. 8A-8C with the filters described in connection with FIGS. 14A-14B. The data for the simulated eye-pattern 870 indicates an open eye pattern, which shows a dramatic improvement in the signal-to-noise ratio for a receiver according to the present invention. The BER was determined to be approximately $8 \times 10^{-11}$, which is more than a four order or magnitude improvement over the prior art receives described in connection with FIGS. 1 and 2.

EQUIVALENTS

While the present teachings are described in conjunction with various embodiments and examples, it is not intended that the present teachings be limited to such embodiments. On the contrary, the present teachings encompass various alternatives, modifications and equivalents, as will be appreciated by those of skill in the art, may be made therein without departing from the spirit and scope of the invention.

What is claimed is:

1. A DPSK/DQPSK optical receiver comprising:
   a) an optical splitter having an input that receives a DPSK/DQPSK modulated optical signal and a plurality of outputs, the optical splitter separating the DPSK/DQPSK modulated optical signal into a plurality of channels according to a fixed non-equal optical power splitting ratio C:(1−C) propagating a plurality of received optical signals to the plurality of outputs, the optical power splitting ratio being chosen to reduce degradation caused by at least one of chirping, chromatic dispersion, polarization-mode dispersion, and spectrally narrowing;
   b) a plurality of delay interferometers, an input of a respective one of the plurality of delay interferometers being optically coupled to a respective one of the plurality of outputs of the optical splitter, each of the plurality of delay interferometers passing a filtered optical signal, the delay interferometers comprising an optical delay and a variable phase shifter being configured so that a free spectral range and a phase shift of each of the plurality of delay interferometers are separately tuned to reduce degradation caused by at least one of chirping, chromatic dispersion, polarization-mode dispersion, and spectrally narrowing;
   c) a plurality of optical detectors, an input of a respective one of the plurality of optical detectors being optically coupled to an output of a respective one of the plurality of optical filters, each of the plurality of optical detectors generating an electrical detection signal related to a power of a respective filtered optical signal;
   d) a plurality of electrical amplifiers, an output of each of the plurality of optical detectors being electrically coupled to an input of one of the plurality of amplifiers, each of the plurality of electrical amplifiers generating an amplified electrical signal; and
   e) at least one electrical signal combiner having a plurality of inputs, an output of a respective one of the plurality of electrical amplifiers being electrically connected to a respective one of the plurality of inputs of the at least one electrical combiner so that each input of the least one electrical signal combiner receives a signal corresponding to a channel propagating a received optical signal separated by the splitter with the fixed non-equal optical power splitting ratio C:(1−C), the at least one electrical combiner adding or subtracting the amplified electrical detection signals generated by the plurality of electrical amplifiers into a combined reception signal at an output.

2. The DPSK/DQPSK optical receiver of claim 1 further comprising a limiting amplifier having an input of that is electrically connected to the output of the at least one electrical signal combiner, the limiting amplifier limiting a maximum power of the combined reception signal.

3. The DPSK/DQPSK optical receiver of claim 1 wherein the optical splitter comprises a fixed power splitting ratio.

4. The DPSK/DQPSK optical receiver of claim 1 wherein the optical splitter comprises a variable power splitting ratio.

5. The DPSK/DQPSK optical receiver of claim 1 wherein the optical power splitting ratio is chosen to reduce effects of chirping in the received DPSK/DQPSK modulated optical signal on the combined reception signal.

6. The DPSK/DQPSK optical receiver of claim 1 wherein the optical power splitting ratio is chosen to reduce effects of optical signal degradation in the received DPSK/DQPSK modulated optical signal resulting from at least one of chromatic dispersion and polarization-mode dispersion on the combined reception signal.

7. The DPSK/DQPSK optical receiver of claim 1 wherein at least one of the plurality of amplifiers comprises a gain/loss that reduces effects of chirping in the received DPSK/DQPSK modulated optical signal on the combined reception signal.

8. The DPSK/DQPSK optical receiver of claim 1 wherein at least one of the plurality of amplifiers comprises a gain/loss that reduces optical signal degradation resulting from at least one of chromatic dispersion and polarization-mode dispersion in the received DPSK/DQPSK modulated optical signal on the combined reception signal.

9. The DPSK/DQPSK optical receiver of claim 1 wherein the at least one electrical combiner comprises a plurality of electrical combiners.

10. The DPSK/DQPSK optical receiver of claim 1 further comprising an interferometer with a destructive arm comprising a derivative filter that regenerates an optical RZ signal.

11. A method of demodulating a DPSK/DQPSK modulated optical signal, the method comprising:
   a) splitting a received DPSK/DQPSK modulated optical signal into a plurality of channels propagating received optical signals according to a fixed non-equal optical power splitting ratio C:(1−C), the optical power splitting ratio being chosen such that a gain in at least one particular channel of the plurality of channels reduces signal degradation caused by at least one of chirping, chromatic dispersion, polarization-mode dispersion, and spectrally narrowing;
   b) filtering each of the plurality of received optical signals with a respective one of a plurality of delay interferometers, wherein each of the plurality of delay interferometers comprises an optical delay and a variable phase shifter configured so that a free spectral range and a phase shift of each of the plurality of delay interferometers are separately tuned to reduce degradation caused by at least one of chirping, chromatic dispersion, polarization-mode dispersion, and spectrally narrowing;
   c) detecting each of the plurality of filtered optical signals with a corresponding one of a plurality of optical detectors and generating from each detected filter optical signal an electrical detection signal, each of the plurality of electrical detection signals having a power that is related to a power of a respective filtered optical signal;
   d) electrically amplifying each electrical detection signal with a predetermined gain/loss; and
   e) adding or subtracting each amplified electrical detection signal representing each of the plurality of received optical signals propagated in each of the plurality of channels split according to the fixed non-equal optical power splitting ratio C:(1−C) into a combined reception signal.

12. The method of claim 11 wherein the amplifying each of the plurality of electrical detection signals comprises adjusting gain/loss of at least one of a plurality of amplifiers to reduce effects of chirping in the received DPSK/DQPSK modulated optical signal on the combined reception signal.

13. The method of claim 11 wherein the amplifying each of the plurality of electrical detection signals comprises adjusting gain/loss of at least one of a plurality of amplifiers to reduce effects resulting from at least one of chromatic dispersion and polarization-mode dispersion in the received DPSK/DQPSK modulated optical signal on the combined reception signal.

14. The method of claim 11 wherein the amplifying each of the plurality of electrical detection signals comprises adjusting gain/loss of at least one of a plurality of amplifiers to reduce effects of spectrally narrowing in the received DPSK/DQPSK modulated optical signal on the combined reception signal.

15. The method of claim 11 further comprising limiting an amplitude of the combined reception signal.

16. The method of claim 11 wherein the splitting the received DPSK/DQPSK modulated optical signal into a plurality of received optical signals is performed with predetermined fixed optical power splitting ratio.

17. The method of claim 11 wherein the optical power splitting ratio is chosen to reduce bit error rate.

18. The method of claim 11 wherein the combining each of the plurality of amplified electrical detection signals into a combined reception signal comprises combining the plurality of electrical detection signals with at least two separate combiners.

19. A DPSK/DQPSK optical receiver comprising:
   a) an optical splitter having an input that receives a DPSK/DQPSK modulated optical signal and a first and second output, the optical splitter separating the received DPSK/DQPSK optical signal into a first and a second channel propagating a first and a second DPSK/DQPSK modulated optical signal with a fixed non-equal optical power splitting ratio C:(1−C) that is chosen such that a gain in at least one channel of the first and second channels reduces signal degradation caused by at least one of chirping, chromatic dispersion, polarization-mode dispersion, and spectrally narrowing;
   b) a first delay interferometer comprising an input optically coupled to the first output of the optical splitter, a first arm comprising an optical delay having a first optical delay, and a second arm comprising a variable phase shifter, wherein a free spectral range and a phase shift of the first delay interferometer are separately tuned;
   c) a second delay interferometer comprising an input optically coupled to the second output of the optical splitter, a first arm comprising an optical delay having a second optical delay, and a second arm comprising a variable phase shifter, wherein a free spectral range and a phase shift of the second delay interferometer are separately tuned to reduce degradation caused by at least one of chirping, chromatic dispersion, polarization-mode dispersion, and spectrally narrowing;
   d) a first and second optical detector, an input of the first optical detector being optically coupled to an output of the first delay interferometer and an input of the second optical detector being optically coupled to an output of the second delay interferometer, the first optical detector generating a first electrical detection signal at an output that is related to the first optical delay and first phase shift and the second optical detector generating a second electrical detection signal at an output that is related to the second optical delay and second phase shift;
   e) a first and second electrical amplifier, an input of the first electrical amplifier being electrically connected to the output of the first optical detector and an input of the second electrical amplifier being electrically connected to the output of the second optical detector; and
   f) a combiner having a first input that is electrically coupled to an output of the first electrical amplifier and a second input that is electrically coupled to the output of the second electrical amplifier, the combiner generating a combined reception signal that is proportional to a difference between a signal from the first electrical amplifier and a signal from the second electrical amplifier.

20. The DPSK/DQPSK optical receiver of claim 19 wherein the first and the second optical delay are not equal.

21. The DPSK/DQPSK optical receiver of claim 19 wherein the optical splitter comprises an unequal splitting ratio.

22. The DPSK/DQPSK optical receiver of claim 19 wherein at least one of the first optical delay, the first phase shift, the second optical delay, and the second phase shift are chosen to reduce effects of chirping in the received DPSK/DQPSK modulated optical signal on the combined reception signal.

23. The DPSK/DQPSK optical receiver of claim 19 wherein at least one of the first optical delay, the first phase shift, the second optical delay, and the second phase shift are chosen to reduce effects of optical signal degradation in the received DPSK/DQPSK modulated optical signal resulting from at least one of chromatic dispersion and polarization-mode dispersion on the combined reception signal.

24. A DPSK/DQPSK optical receiver comprising:
   a) an optical splitter having an input that receives a DPSK/DQPSK modulated optical signal and a first and second output, the optical splitter separating the received DPSK/DQPSK optical signal into a first and a second channel propagating a first and a second DPSK/DQPSK modulated optical signal with a fixed non-equal optical power splitting ratio $C:(1-C)$ that is chosen such that a gain in at least one channel of the first and second channels reduces signal degradation caused by at least one of chirping, chromatic dispersion, polarization-mode dispersion, and spectrally narrowing;
   b) a delay interferometer comprising an input optically coupled to the first output of the optical splitter, a first arm comprising an optical delay, and a second arm comprising a variable phase shifter, wherein a free spectral range and a phase shift of the first delay interferometer are separately tuned to reduce degradation caused by at least one of chirping, chromatic dispersion, polarization-mode dispersion, and spectrally narrowing;
   c) an optical filter having an input optically coupled to the second output of the optical splitter;
   d) a first and second optical detector, an input of the first optical detector being optically coupled to an output of the delay interferometer and an input of the second optical detector being optically coupled to an output of the optical filter, the first optical detector generating at an output a first electrical detection signal related to the optical delay and phase shift resulting from the phase shifter, and the second optical detector generating at an output a second electrical detection signal related to a transfer function of the optical filter;
   e) a first and second electrical amplifier, an input of the first electrical amplifier being electrically connected to the output of the first optical detector and an input of the second electrical amplifier being electrically connected to the output of the second optical detector; and
   f) a combiner having a first input that is electrically coupled to an output of the first electrical amplifier and a second input that is electrically coupled to the output of the second electrical amplifier, the combiner generating a combined reception signal that is proportional to a difference between a signal from the first electrical amplifier and a signal from the second electrical amplifier.

25. The DPSK/DQPSK optical receiver of claim 24 wherein at least one of the optical delay, a phase shift caused by the phase shifter, and the transfer function of the optical filter are chosen to reduce effects of optical signal degradation in the received DPSK/DQPSK modulated optical signal resulting from at least one of chromatic dispersion and polarization-mode dispersion on the combined reception signal.

26. The DPSK/DQPSK optical receiver of claim 24 wherein at least one of the optical delay, a phase shift caused by the phase shifter, and the transfer function of the optical filter are chosen to reduce effects of chirping in the received DPSK/DQPSK modulated optical signal on the combined reception signal.

27. The DPSK/DQPSK optical receiver of claim 24 further comprising an interferometer with a destructive arm comprising a derivative filter that regenerates an optical RZ signal.

\* \* \* \* \*